(12) United States Patent
Yamada et al.

(10) Patent No.: US 7,616,447 B2
(45) Date of Patent: Nov. 10, 2009

(54) IC CARD

(75) Inventors: Hiroyuki Yamada, Osaka (JP); Yoshiteru Mori, Osaka (JP); Kenji Nishimura, Osaka (JP); Yutaka Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 256 days.

(21) Appl. No.: 11/629,789

(22) PCT Filed: Jun. 17, 2005

(86) PCT No.: PCT/JP2005/011149

§ 371 (c)(1),
(2), (4) Date: Apr. 9, 2007

(87) PCT Pub. No.: WO2005/124670

PCT Pub. Date: Dec. 29, 2005

(65) Prior Publication Data

US 2007/0263365 A1 Nov. 15, 2007

(30) Foreign Application Priority Data

Jun. 18, 2004 (JP) ............................. 2004-181039

(51) Int. Cl.
H05K 1/14 (2006.01)

(52) U.S. Cl. ...................................... 361/737; 361/748

(58) Field of Classification Search ................. 361/737, 361/727
See application file for complete search history.

(56) References Cited

U.S. PATENT DOCUMENTS

| 5,384,688 | A | * | 1/1995 | Rockwell ...................... 361/736 |
| 5,717,435 | A | * | 2/1998 | Fukushima et al. .......... 345/179 |
| 6,085,982 | A |   | 7/2000 | Nakashima |
| 7,490,198 | B2 | * | 2/2009 | Okaue et al. ................. 711/115 |
| 2004/0123059 | A1 | | 6/2004 | Suda |
| 2005/0086433 | A1 | | 4/2005 | Okaue et al. |

FOREIGN PATENT DOCUMENTS

| JP | 02-056682 | 4/1990 |
| JP | 10-171959 | 6/1998 |
| JP | 2004-086503 | 3/2004 |
| WO | 2004/047111 | 6/2004 |

* cited by examiner

*Primary Examiner*—Hung S Bui
(74) *Attorney, Agent, or Firm*—Wenderoth, Lind & Ponack, L.L.P.

(57) ABSTRACT

An IC memory card (11) has a mode change switch (18) for switching operation modes of a semiconductor component in the vicinity of an end side opposite the external connection terminals (17a to 17i). A controller LSI (24) detects the status of the mode change switch (18) and switches operation modes according to the detected status.

11 Claims, 21 Drawing Sheets

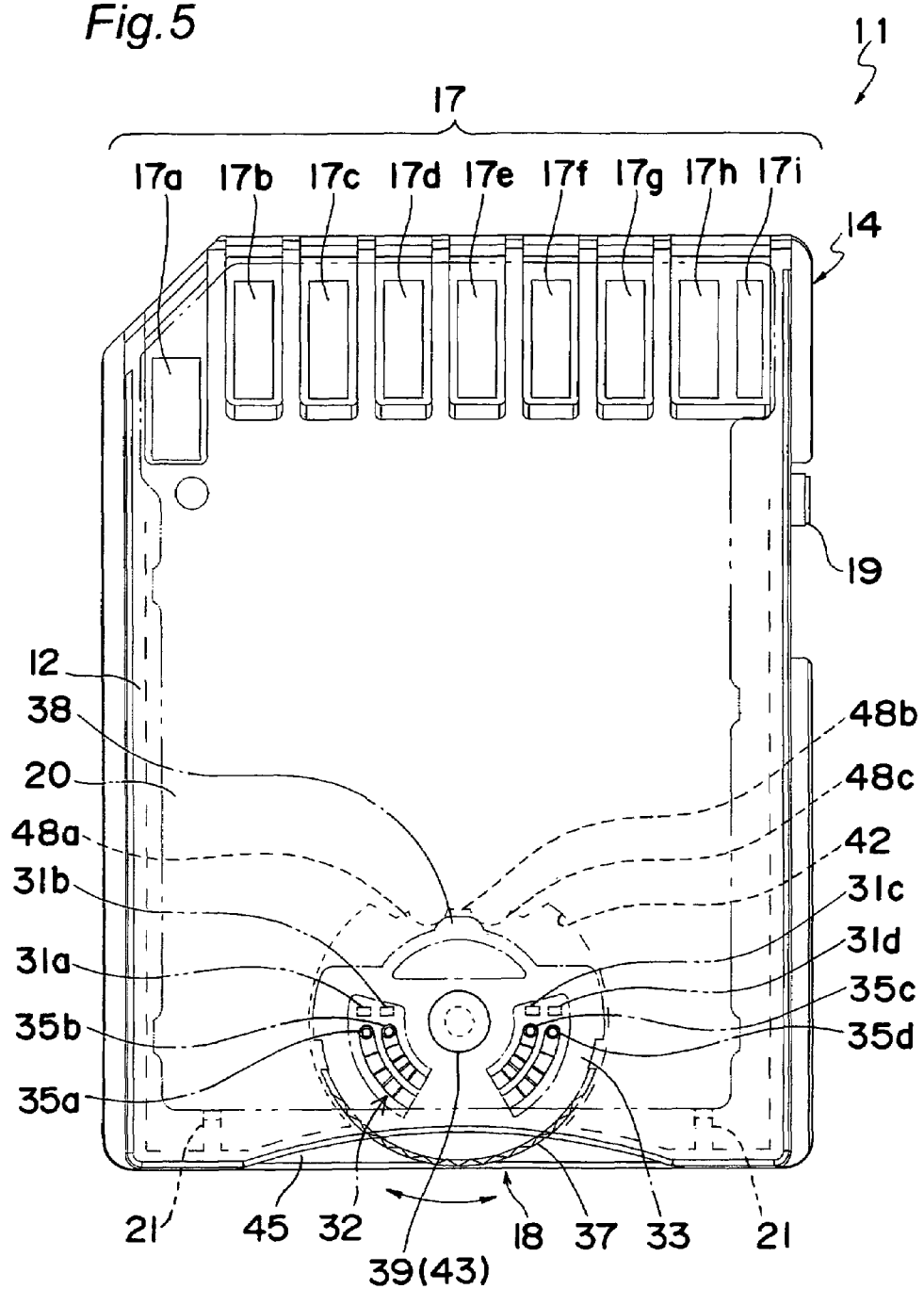

IC CARD

BACKGROUND OF THE INVENTION

1. Technical Field

The present invention relates to an IC card suitable for use in various devices such as various information devices, video devices, and communication devices, including small portable devices.

2. Description of the Related Art

In the present specification, a memory card such as an IC memory card that incorporates a semiconductor memory and is used as an information medium for storing information of various types such as data, audio signals, and video signals, a card-type device or PC card having functions other than the information storage function, such as a communication function or an interface function, and a card-type device or PC card that has both the information storage function and the other function are generally termed as an IC card (Integrated Circuit Card). A variety of small and lightweight IC cards, including those of a postage stamp size, have recently been developed and put to practical use. FIG. 20 shows an external appearance of an IC card which is an example of the conventional IC card.

The IC memory card 1 shown in FIG. 20 comprises a memory card body 2 incorporating a semiconductor memory inside thereof. External connection terminals 5 (5a-5i) for electric connection of the semiconductor memory to external devices are provided in a vicinity of an edge on one side of a lower surface of the memory card body 2. Examples of external devices include a variety of information devices, video devices, and communication devices. Further, the IC memory card 1 comprises a write-protect switch 9 for preventing erroneous deletion at a side edge of the memory card body 2. Detection of the status of the write-protect switch 9, which is a physical switch, is performed on the external device side. More specifically, a detection mechanism for detecting the position or status of the write-protect switch 9 is provided at the external device using the IC memory card 1 or at a connector for connecting the memory card 1 to the external device. The write-protect switch 9 of this type is described in Japanese Patent Application Laid-open Publication No. 2001-52135.

It was also suggested to incorporate a write-protect switch inside the memory card body, rather than on the side edge thereof. However, because a memory card is small in size and thin, the switch intended to be incorporated in the memory card body has to be manufactured with high accuracy to small thickness. Further, when a height of the incorporated switch is large, a space or height for accommodating the switch has to be ensured by providing a through hole in a substrate accommodated inside the memory card body and mounting the switch in the through hole.

The increased level of semiconductor component integration made it possible to realize a high-capacity IC memory card or a multifunctional card-type device or PC card. However, some of the presently employed devices are not adapted to such high-capacity IC memory cards or multifunctional card-type devices, and ensuring the compatibility sometimes becomes a problem. Thus, the progress of the IC card to a higher capacity and a large number of functions is being advanced, whereas it is necessary to ensure compatibility with the presently available devices of limited capacity or functions.

SUMMARY OF THE INVENTION

1. Problem to be Solved by the Invention

It is an object of the present invention to provide a small-size, thin, multifunctional IC card of high capacity that ensures compatibility with presently available devices of limited capacity or functions.

2. Means for Solving the Problems

In order to attain the object, an IC card of the present invention comprises a semiconductor component having at least two operation modes, and a physical switch for switching the operation modes of the semiconductor component.

The operation mode of the semiconductor component can be switched by manipulating the physical switch. Therefore, if any one of two or more operation modes is set to a limited storage capacity or to limited functions, then the use with an external device of limited capacity or functions can be ensured by manipulating the physical switch. In other words, if necessary, compatibility with the presently available devices can be ensured by manipulating the physical switch and switching the operation mode.

Specifically, the physical switch can be set to at least two statuses each corresponding to any of one the operation modes. The semiconductor component comprises a controller for detecting the status of the physical switch and switching the operation mode according to the detected status of the physical switch.

More specifically, the physical switch comprises a plurality of electric contacts provided on a substrate having the semiconductor component mounted thereon, a movable first molded component comprising a contact terminal for switching electric connection of the electric contacts; and a second molded component that presses the first molded component against a surface of the substrate where the electric contact is provided, thereby maintaining contact pressure of the contact terminal against the electric contact, and also serves as a part of an exterior molded component that accommodates the substrate having the semiconductor component mounted thereon.

Because the contact pressure applied by the contact terminal to the electric contact is ensured by applying pressure from the second molded component also serving as part of the exterior molded component to the first molded component, the height of the physical switch can be reduced. As a result, it is not necessary to use a thin component requiring precise processing as the first molded component as well as to perform special processing, such as through hole formation, of the substrate. Therefore, a physical switch for switching the operation mode that has a simple configuration can be incorporated in the IC card. In other words, the IC card can be small and thin even though the physical switch for switching the operation mode has been provided therein.

For example, the first molded component of the physical switch can rotate with respect to the substrate and the second molded component. In this arrangement, it is only required to perform manipulation of rotating the first molded component for switching the operation mode and ensuring compatibility with the presently available devices. Alternatively, the first molded component of the physical switch can move linearly with respect to the substrate and the second molded component. In this arrangement, it is only required to perform manipulation of moving the first molded component for switching the operation mode and ensuring compatibility with the presently available devices Where an external connection terminal for electric connection to an external device is disposed on one edge side of the exterior molded component, the physical switch is preferably disposed on the other edge side opposite to the edge of the exterior molded component where the external connection terminal is disposed. By providing the physical switch in this position, the user can see the physical switch even when the external connection terminal side of the IC card is inserted in the external device. In other words, the user can visually recognize the operation mode that is presently set even after the IC card has been inserted into the external device.

The semiconductor component comprises at least one semiconductor memory. The semiconductor memory has a plurality of information storage areas each of which is allocated as a usable area for each of the operation modes. Further, the controller designates the information storage area as the usable area according to the detected status of the physical switch.

If the storage capacity of one of the information storage areas of the semiconductor memory that can be used with respect to any one of the plurality of operation modes is set less than the storage capacity of other information storage area of the semiconductor memory that can be used in other operation mode, then the usable storage capacity of the IC card can be limited to part thereof by switching the operation mode by manipulating the physical switch. Therefore, by switching the operation mode by manipulating the physical switch, the IC card of the present invention can be used even with an external device that is not adapted to IC cards having an information storage area of a high capacity. In other words, by manipulating the physical switch, it is possible to ensure compatibility with respect to the difference in standards of the external devices relating to the storage capacity. The semiconductor memory is, for example, a nonvolatile memory such as a flash memory.

The plurality of information storage areas of the semiconductor memory can be formatted to storage capacity corresponding to respective file systems with each of the information storage areas of the semiconductor memory being allocated as the usable area for any one of the operation modes. For using the IC card with the external device corresponding to each of the file systems, it is only required to manipulate the physical so as to switch the operation mode. For example, because the plurality of information storage areas correspond to respective individual file systems, compatibility with respect to the difference in file systems with external devices can be ensured by manipulating the physical switch.

Alternatively, the semiconductor component comprises a semiconductor memory and other semiconductor component for executing a function other than information storage, and any one or both of the semiconductor memory and the other semiconductor component is allocated to each of the operation modes with the controller activating any one or both of the semiconductor memory and the other component according to the detected status of the physical switch. For designating the information storage function and functions other than the information storage functions, such as communication function, interface function, security function, and electronic money function, it is only required to switch the operation mode by manipulating the physical switch. If a function executable in any one of a plurality of operation modes is restricted comparing to that in other operation modes, then it is possible to limit the function executable by the IC card to some of the plurality of functions by manipulating the physical switch so as to switch the operation mode. This assures that the IC card of the present invention can be used with the existing external devices with restricted function. In other words, by manipulating the physical switch, compatibility with respect to the difference in functions of external devices can be ensured.

3. Effect of the Invention

The IC card of the present invention having the physical switch for switching the operation modes achieve increased capacity and multi functionality as well as compatibility with the existing external devices with limited capacity or functions. Further, because part of the exterior molded component serves as part of the physical switch, the size and thickness of the IC card can be decreased even though the physical switch for switching the operation mode is provided therein.

BRIEF DESCRIPTION OF THE DRAWINGS

FIG. 5 is a transparent view from the lower side of the IC memory card of the first embodiment of the present invention;

DESCRIPTION OF REFERENCE NUMERALS

Figure 1:
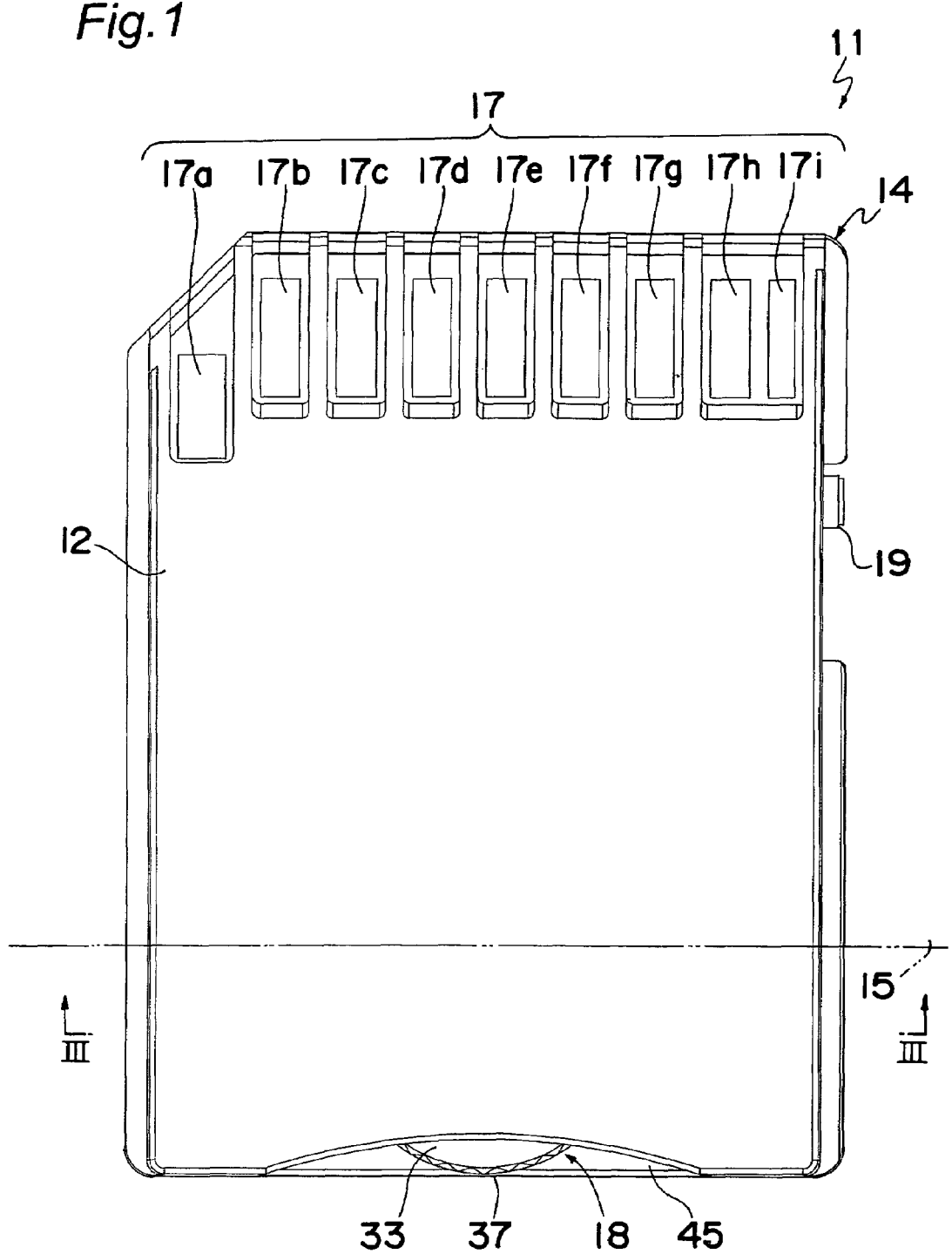
FIG. 1 is a lower side view of an IC memory card of a first embodiment of the present invention.

11: IC memory card
12: lower housing
13: upper housing
14: housing
15: external device
17a-17i: external connection terminal
18: mode change switch
19: write-protect switch
20: substrate
21,22: protrusion
23a-23h: terminal opening
24: controller LSI
25A, 25B: semiconductor memory
26: semiconductor component
27a-27c, 28, 29: terminal
31a-31d: electric contact
32: contact terminal
33: rotary component
34a-34d: elastic piece
35a-35d: contact section
36: base section
37: holding section
38: positioning protrusion
39: bearing hole
40: circular arc hole
42: accommodation concave section
43: shaft section
44: through hole
45: concave section
46: opening
48: notch
51A, 51B, 51C: semiconductor memory
53: IC card
54: other semiconductor memory
51: mode change switch
52a-52d: electric contact
53: contact terminal
54: slide member
55a-55d: elastic piece
56a-56d: contact section
57: base section
58: holding section
59: protruding section
61: positioning protrusion
62a, 62b: rectangular hole
63: accommodation concave section
64: window hole
65a-65c: notch.

DETAILED DESCRIPTION OF THE INVENTION

First Embodiment

Figure 2:
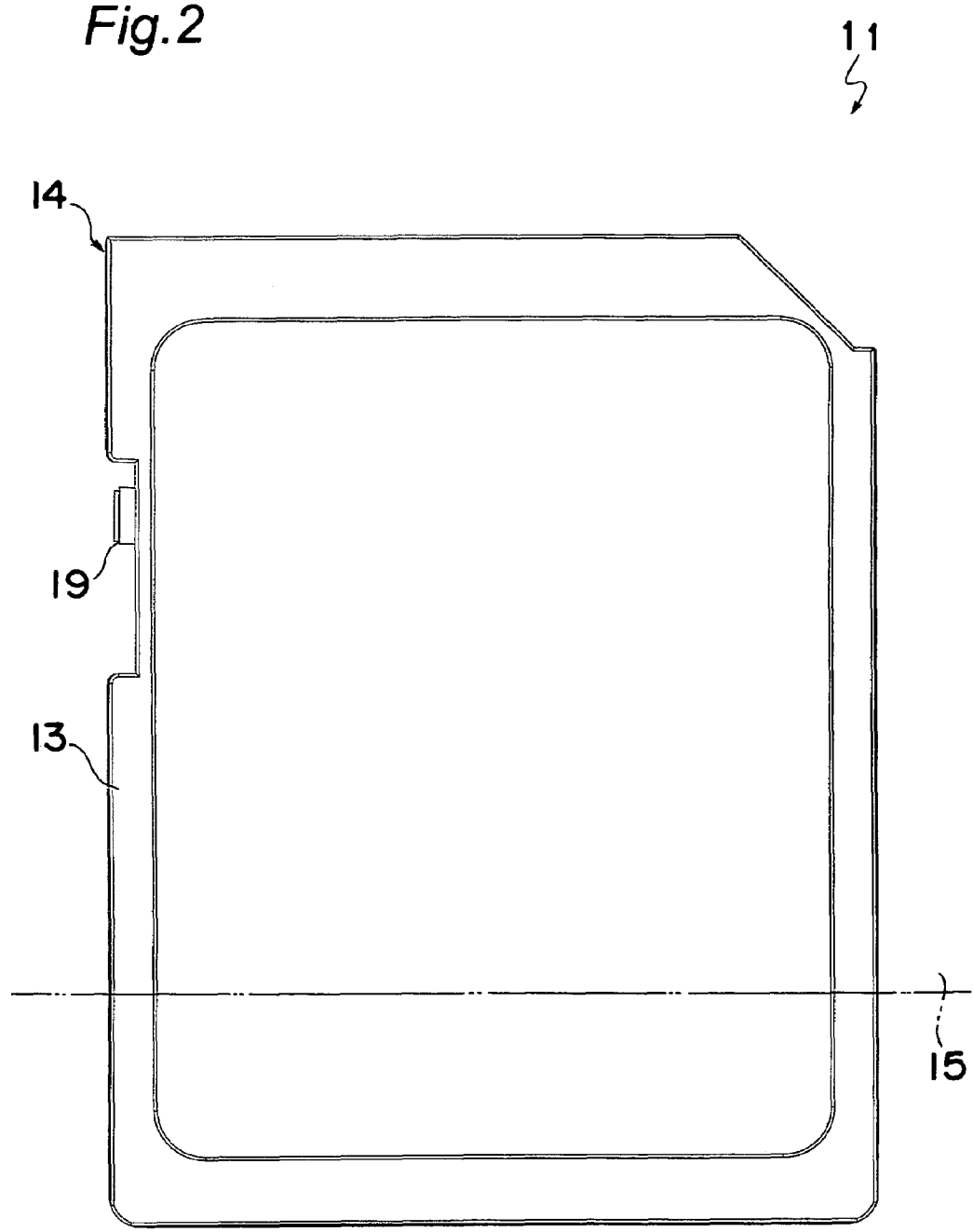
FIG. 2 is an upper side view of an IC memory card of the first embodiment of the present invention.
Figure 3:
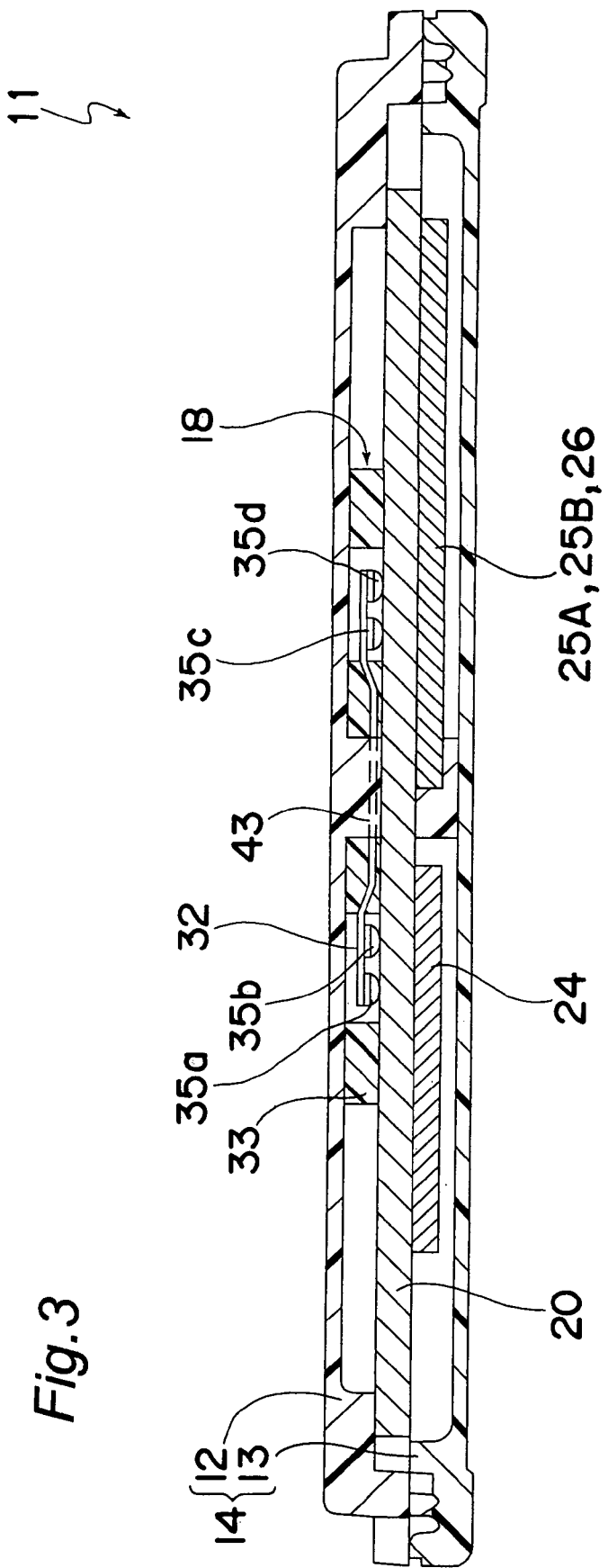
FIG. 3 is a schematic enlarged cross-sectional view along a line III-III in FIG. 1.
Figure 4:
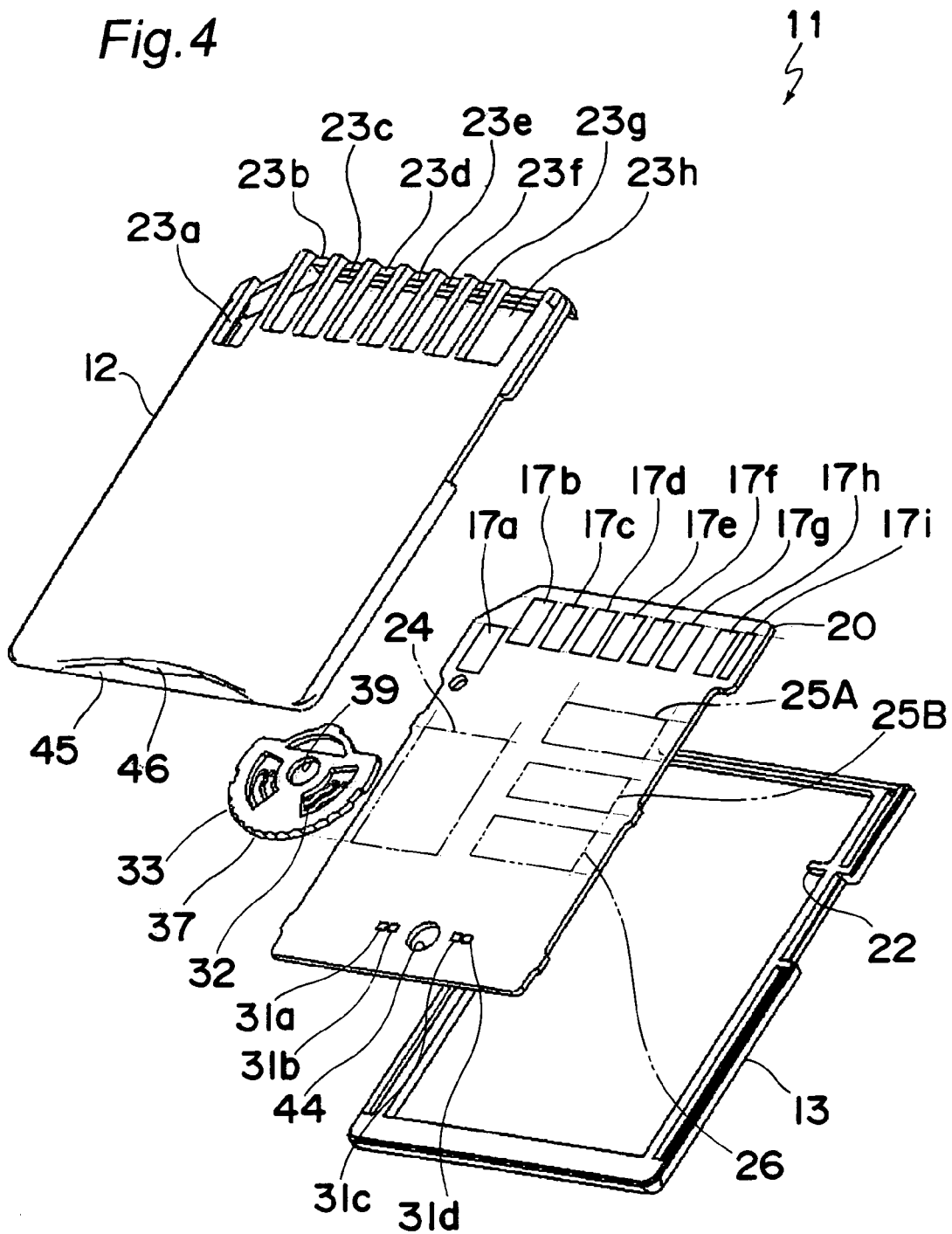
FIG. 4 is an exploded perspective view of the IC memory card of the first embodiment of the present invention.

FIG. 1 to FIG. 7 show an IC memory card (IC card) 11 of a first embodiment of the present invention. As shown in FIG. 3 and FIG. 4, the IC memory card 11 has a housing (exterior molded component) 14 comprising a lower housing (second molded component) 12 and an upper housing 13 that are joined together. Both the lower housing 12 and the upper housing 13 are molded from a resin. Referring to FIG. 1 and FIG. 2, external connection terminals 17 for electric connection to an external device 15 (including a connector for connection of the external device 15 and the IC memory card 11) are disposed in the vicinity of one edge of the lower housing 12 of the housing 14. Examples of the external device 15 include various information devices, video devices and communication devices, including small portable devices. In the present embodiment, there are nine external connection terminals 17a to 17i. Among those external connection terminals 17a to 17i, the external connection terminals 17a, 17b, 17h, and 17i are used for exchanging data or information with the external device 15, the external connection terminals 17c and 17f are used for receiving clock signals or commands from the external device 15, and the external connection terminals 17d and 17f are used for supplying power from the external device 15. In the vicinity of another edge of the lower housing 12 of the housing 14 opposite to the edge where the external connection terminals 17 are disposed, a mode change switch (physical switch) 18 for switching the below-described operation modes is disposed. A write-protect switch 19 for preventing the erroneous deletion is provided on a right side edge (in FIG. 1) of the housing 14.

Figure 8:
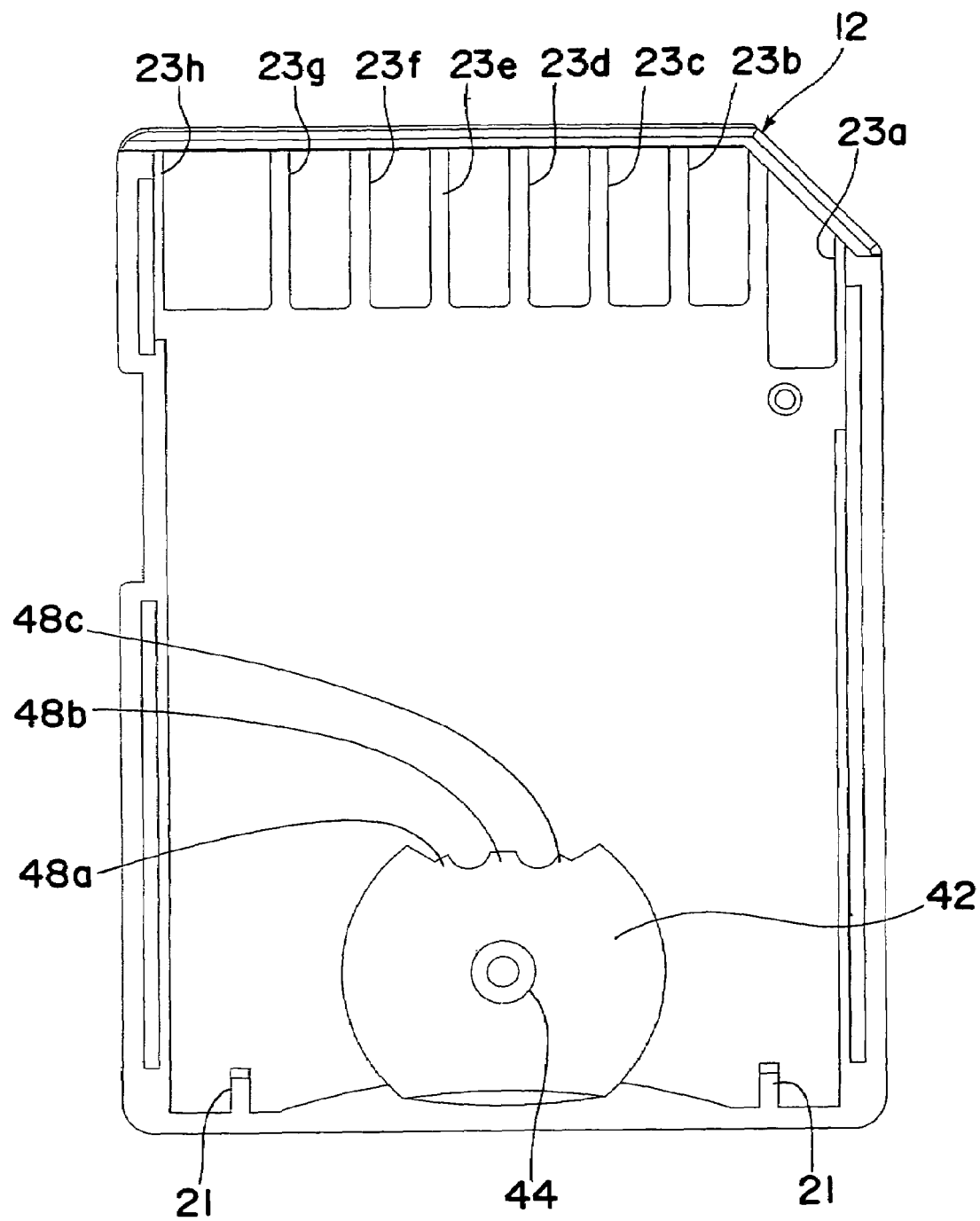
FIG. 8 illustrates an inner surface side of a lower housing.
Figure 9:
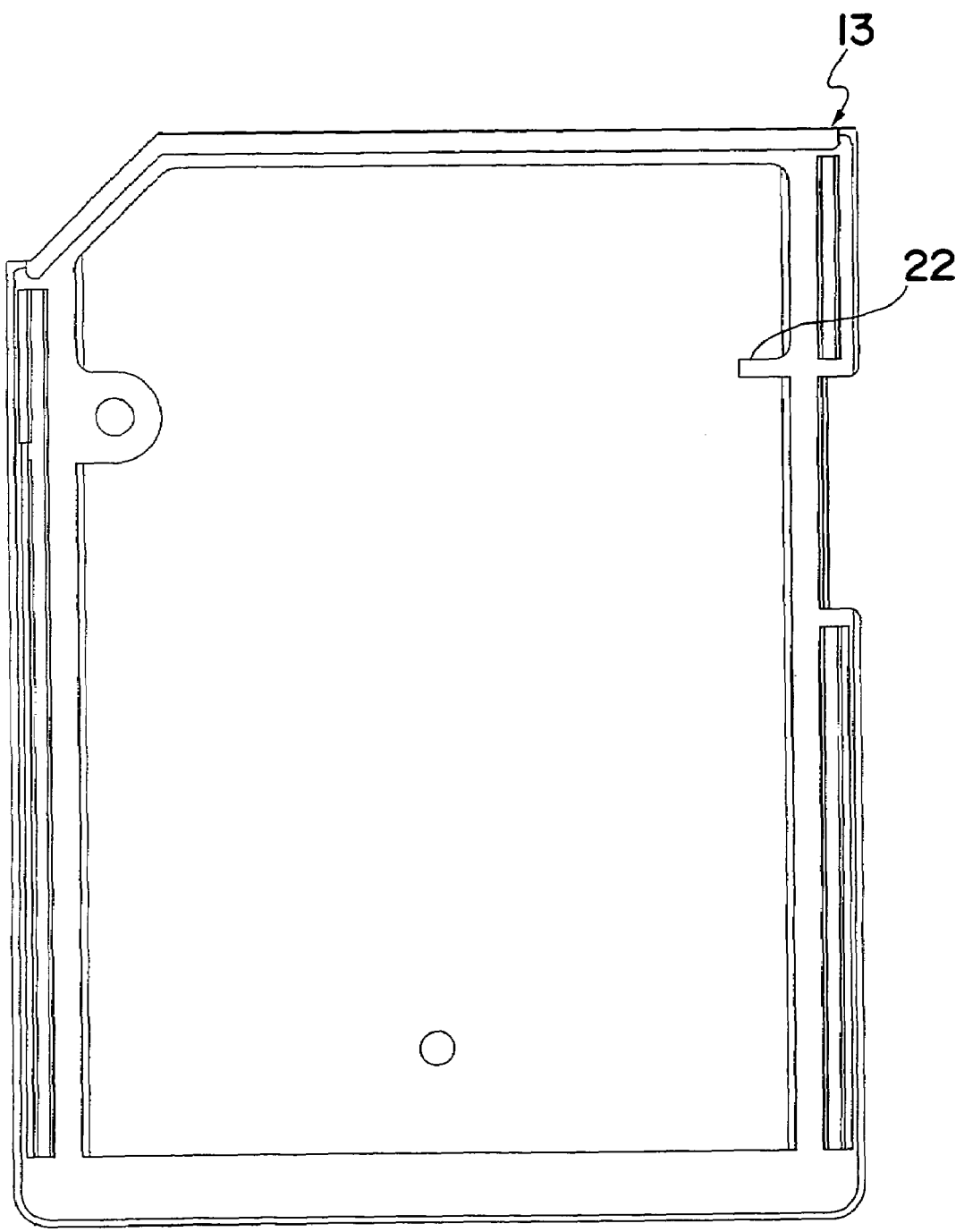
FIG. 9 illustrates an inner surface side of an upper housing.

Referring to FIGS. 3, 4, and 5, a substrate 20 and a rotary component 33 of the mode change switch 18 is contained in the housing 14. As shown in FIG. 8, a pair of protrusions 21 for positioning the substrate 20 is provided on an inner surface of the lower housing 12. As shown in FIG. 9, a protrusion 22 for positioning the substrate 20 is provided on an inner surface of the upper housing 13.

Referring to FIGS. 4 and 5, on a surface of the substrate 20 on the side of the lower housing 12, the aforementioned external connection terminals 17a to 17i are provided in the vicinity of one edge. Terminal openings 23a to 23h are provided in positions corresponding to the external connection terminals 17a to 17i in the vicinity of one edge of the lower housing 12 (see also FIG. 8). The external connection terminals 17a to 17i are exposed from the terminal openings 23a to 23h. Further, on the surface of the substrate 20 on the side of the lower housing 12, electric contacts 31a to 31d of the mode change switch 18 are disposed in the vicinity of the edge opposite to the external connection terminals 17a to 17i.

Figure 7:
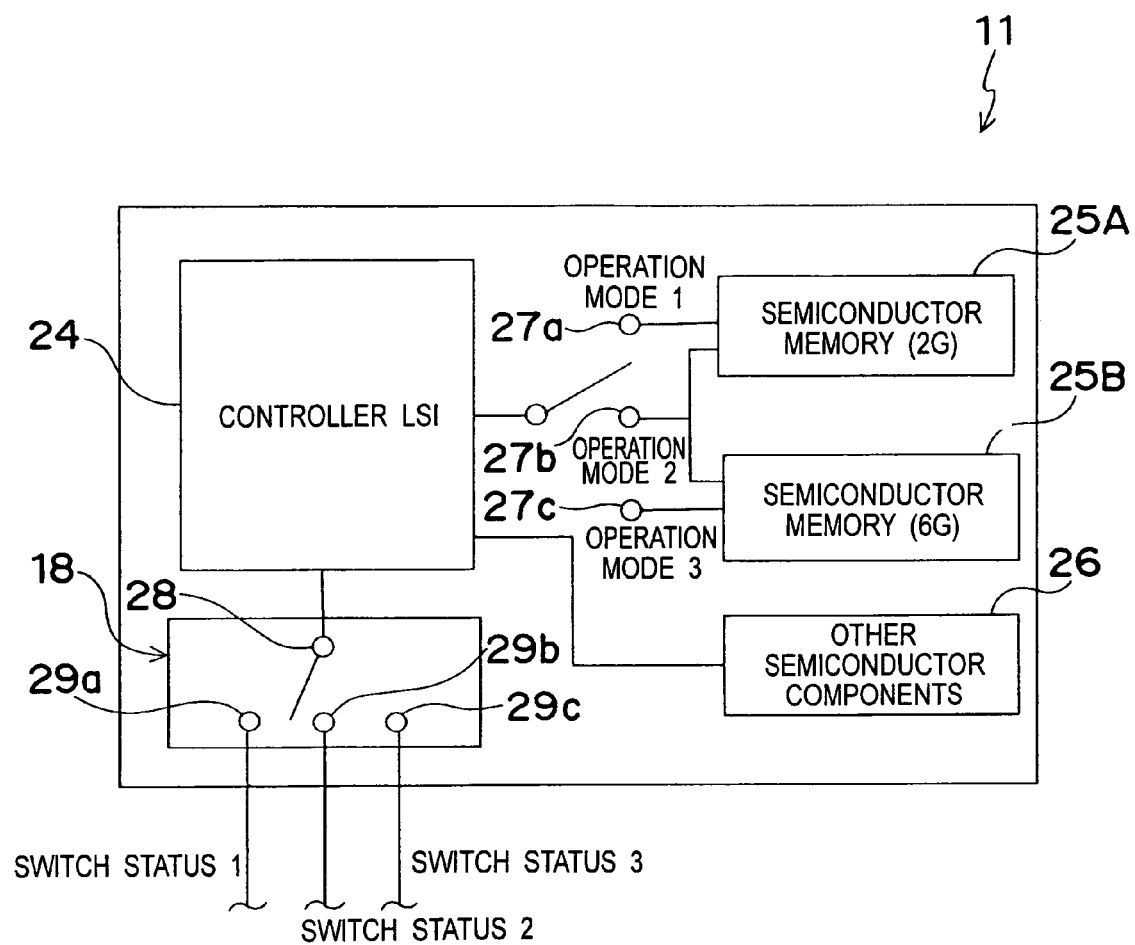
FIG. 7 is a block diagram illustrating a schematic structure of the IC memory card of the first embodiment of the present invention.

As shown in FIGS. 3, 4, and 7, a variety of semiconductor components are mounted on the substrate 20. Specifically, a controller LSI (controller) 24 and semiconductor memories 25A and 25B that are nonvolatile memories such as flash memories are mounted on a surface of the substrate 20 opposite to the side where the external connection terminals 17a to 17i and electric contacts 31a to 31d are disposed. In the present embodiment, a capacity of the information storage area of one semiconductor memory 25A is 2 gigabytes, whereas a capacity of the information storage area of the other semiconductor memory 25B is 6 gigabytes. Further, depending on requirements due to circuit configurations, other chip components or semiconductor components 26 having functions other than information storage can be also mounted on the substrate 20. Furthermore, conductive paths (not shown in the figures) for electrically connecting the external connection terminals 17, electric contacts 31a to 31d, controller LSI 24, semiconductor memories 25A and 25B, and other semiconductor components 26 are formed on the substrate 20.

The controller LSI 24 controls an entire operation of the IC memory card 11. In particular, the controller LSI 24 executes operations relating to receiving data and various types of information such as audio signals and video signals from the external device 15, writing data or information to the semiconductor memories 25A and 25B, reading data or information from the semiconductor memories 25A and 25B, and transmission of data or information to the external device 15.

The IC memory card 11 of the present embodiment has three modes (operation modes) relating to the operation and functions of the controller LSI 24 and semiconductor memories 25A and 25B. These three operation modes will be referred to hereinbelow as "Operation Mode 1", "Operation Mode 2", and "Operation Mode 3". As described hereinbelow, the operation mode of the IC memory card 11 can be set to any one those "Operation Mode 1", "Operation Mode 2", and "Operation Mode 3" by manipulating the mode change switch 18.

The "Operation Mode 1" is an operation mode in which only the semiconductor memory 25A of 2 gigabytes is the control object of the controller LSI 24. In other words, the storage capacity of the IC memory card 11 in the "Operation Mode 1" is 2 gigabytes. In a schematic block-diagram shown in FIG. 7, a status in which the controller LSI 24 is connected to a terminal 27a corresponds to the "Operation Mode 1".

The "Operation Mode 2" is an operation mode in which both the semiconductor memory 25A of 2 gigabytes and the semiconductor memory 25B of 6 gigabytes are the control objects of the controller LSI 24. In other words, the storage capacity of the IC memory card 11 in the "Operation Mode 2" is 8 gigabytes. In FIG. 7, a status in which the controller LSI 24 is connected to a terminal 27b corresponds to the "Operation Mode 2".

The "Operation Mode 3" is an operation mode in which only the semiconductor memory 25B of 6 gigabytes is the control object of the controller LSI 24. In other words, the storage capacity of the IC memory card 11 in the "Operation Mode 3" is 6 gigabytes. In FIG. 7, a state in which the controller LSI 24 is connected to a terminal 27c corresponds to the "Operation Mode 3".

The mode change switch 18 will be described below. In the present embodiment, the mode change switch 18 is a rotary switch. Referring to FIGS. 3 to 5, the mode change switch 18 comprises four electric contacts 31a to 31d provided on the same surface of the substrate 20 as the surface where the external connection terminals 17 are provided, and a rotary component (first molded component) 33 to which a contact terminal 32 for switching the electric connection of the electric contacts 31a to 31d is attached. The rotary component 33 is obtained by molding a resin. Further, as described later, the lower housing 12 of the housing 14 also functions as a part of the mode change switch 18. As most clearly shown in FIGS. 3 and 4, the rotary component 33 is disposed between the lower housing 12 and substrate 20.

Figure 10A:
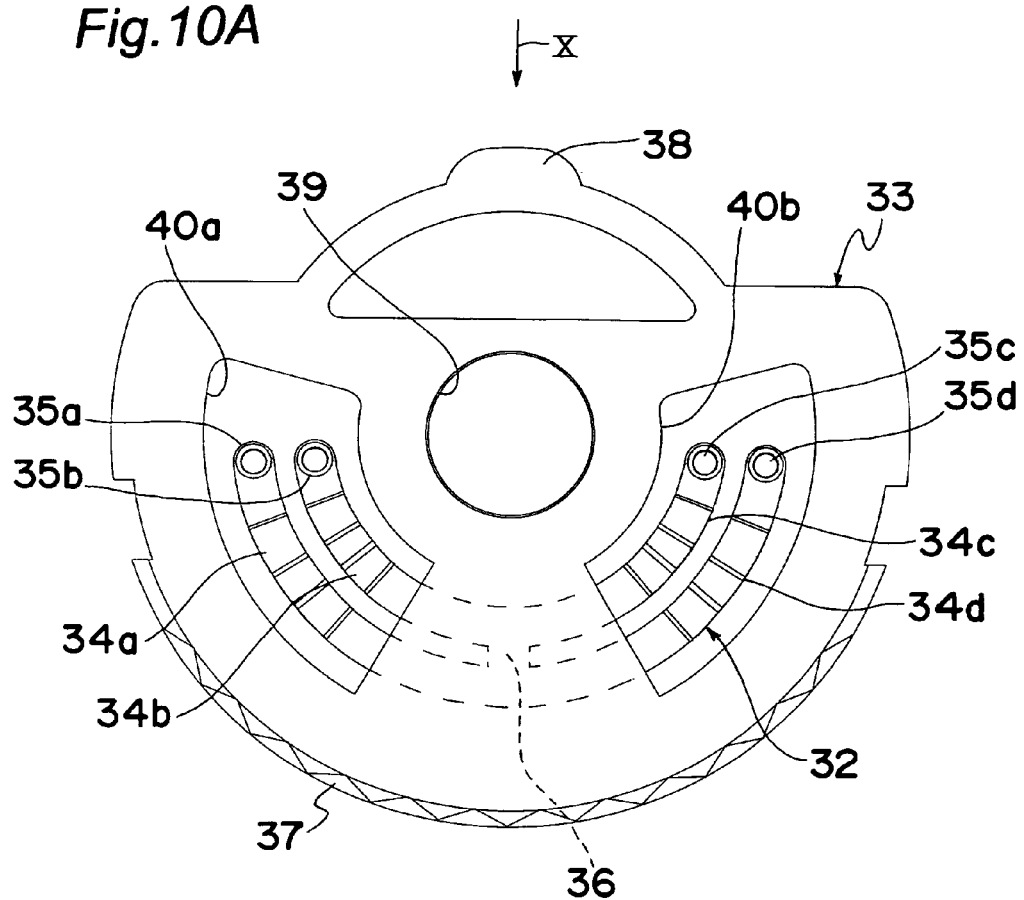
FIG. 10A is a plan view of a rotary component.
Figure 10B:
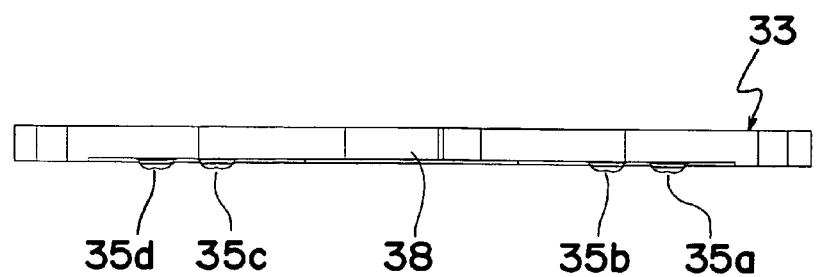
FIG. 10B is a view illustrating the rotary component, as viewed from an arrow X in FIG. 10A.

Also referring to FIGS. 10A and 10B, the contact terminal 32 comprises four elastic pieces 34a to 34d in the form of circular arcs. Contact sections 35a to 35d are provided on distal ends of respective elastic pieces 34a to 34d. On the other hand, proximal sides of the elastic pieces 34a to 34d are joined to each other by a common base section 36.

The rotary component 33 comprises a holding section 37 at a lower side portion in FIG. 10A. An outer edge of the holding section 37 is of a circular arc shape and has formed thereon small continuously repeated protrusions for preventing slippage. Further, the rotary component 33 comprises a positioning protrusion 38 protruding outwardly at a portion opposite the holding section 37. A bearing hole 39, which is a round hole passing through in the thickness direction, is formed at a center portion of the rotary component 33. In addition, in the rotary component 33, a pair of circular arc holes 40a, 40b are formed so as to pass through in the thickness direction on both sides of the bearing hole 39. The base section 36 of the contact terminal 32 is molded in the rotary component 33, and thereby the contact terminal 32 is fixed to the rotary component 33. The elastic pieces 34a and 34b of the contact terminal 32 protrude into one circular arc hole 40a, whereas the elastic pieces 34c and 34d protrude into the other circular arc hole 40b.

Also referring to FIG. 8, an accommodation concave section 42 having an outer contour similar to that of the rotary component 33 is formed in the vicinity of the edge of the inner surface of the lower housing 12 opposite to the terminal openings 23a to 23h. The rotary component 33 is accommodated in the accommodation concave section 42. A cylindrical shaft section 43 protrudes from a bottom surface of the accommodation concave section 42. The shaft section 43 passes through the bearing hole 39 of the rotary component 33 accommodated in the accommodation concave section 42. Thus, the rotary component 33 can rotate inside the accommodation concave section 42 about the shaft section 43 with respect to the substrate 20 and housing 14. The shaft section 43 extends through a through hole 44 (shown in FIG. 4) of the substrate 20, reaching the inner surface of the upper housing 13. In FIG. 5, the two electric contacts 31a, 31b are positioned on a left side of the shaft section 43, and the remaining two electric contacts 31c, 31d are positioned on a right side.

As shown in FIGS. 1, 4, and 5, a concave section 45 is formed in the edge of the outer surface of the lower housing 12 opposite to the terminal openings 23a to 23h. Further, an opening 46 (see FIG. 4) communicating the concave section 45 with the accommodation concave section 42 is provided in the lower housing 12. As most clearly shown in FIG. 1, part of the holding section 37 of the rotary component 33 accommodated inside the accommodation concave section 42 is exposed to the outside of the housing 14 via the opening 46. Therefore, the user can rotate the rotary component 33 about the shaft section 43 by manipulating the holding section 37.

As described above, the rotary component 33 is disposed between the lower housing 12 and substrate 20. A space between the lower housing 12 and substrate 20, more specifically, the space between the lower surface of the accommodation concave section 42 and substrate 20, is approximately limited to a thickness of the rotary component 33. Therefore, the rotary component 33 is pressed or pushed by the lower housing 12 to the substrate 20. Such pushing action of the lower housing 12 ensures the contact pressure between the contact sections 35a to 35b of the contact terminal 32 fixed to the rotary component 33 and the electric contacts 31a to 31d. Thus, pushing the rotary component 33 with the lower housing 12, which is a part of the housing 14, ensures the contact pressure between the contact terminal 32 and electric contacts 31a to 31d. Therefore, a height of the mode change switch 18 can be decreased. This results in that the rotary component 33 is not required to be a thin component that needs accurate processing, and that the substrate 20 is not required to be subjected to special processing such as the formation of a through hole to dispose the rotary component 33. Thus, the mode change switch 18 can be incorporated in the IC memory card 11 with a simple arrangement. In other words, the IC memory card 11 is thin and small in size even though the mode change switch 18 is provided therein.

Figure 6A:
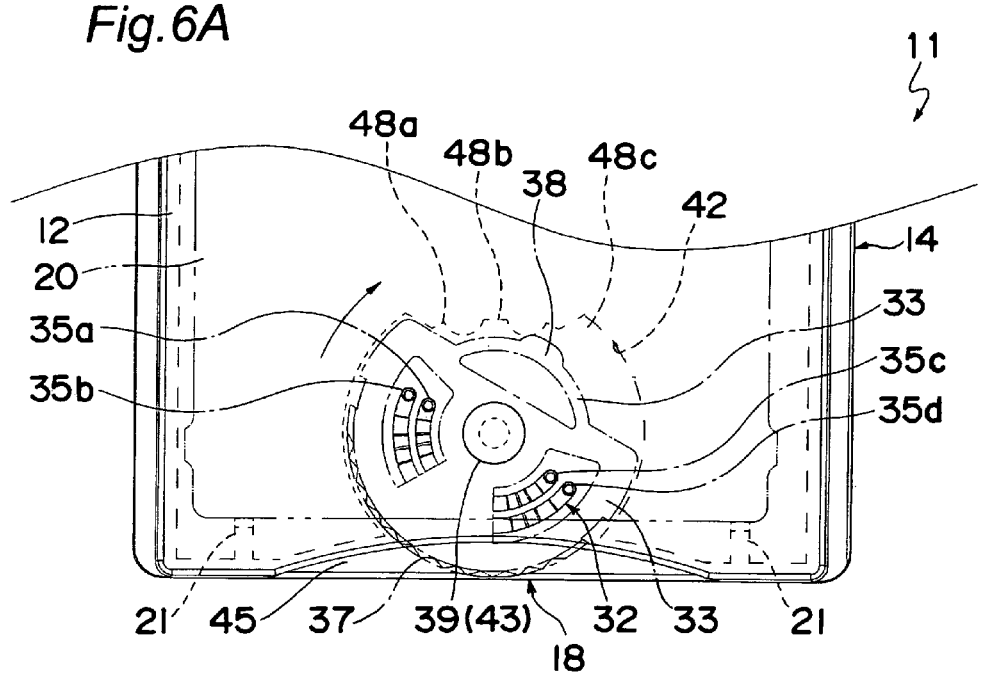
FIG. 6A is a partial transparent view from the lower side of the IC memory card of the first embodiment of the present invention in which a mode change switch is set to a switch status 1.
Figure 6B:
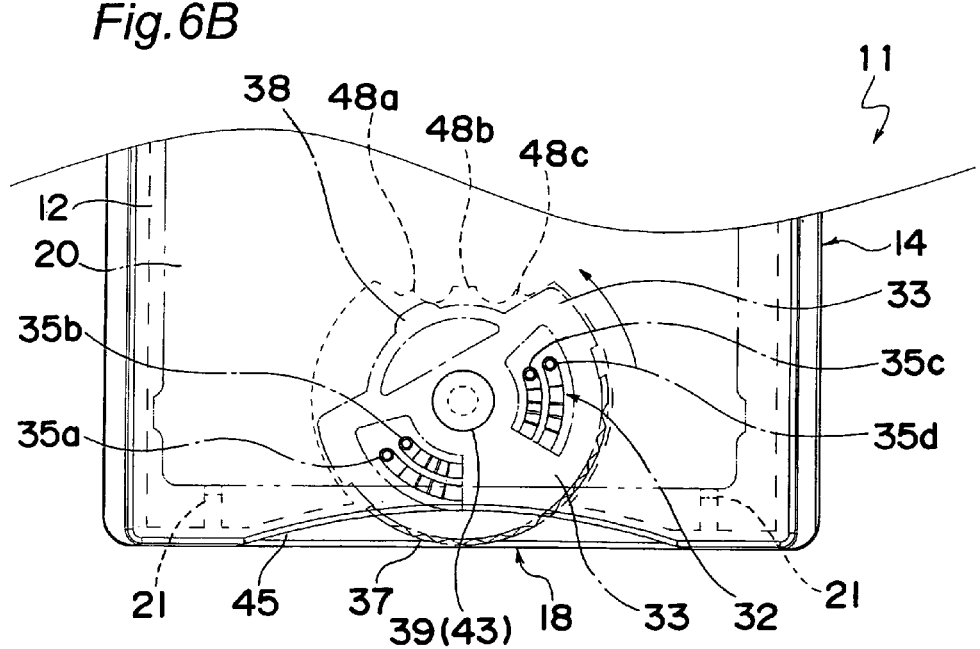
FIG. 6B is a partial transparent view from the lower side of the IC memory card of the first embodiment of the present invention in which the mode change switch is set to a switch status 3.

Referring to FIGS. 5 and 8, notches 48a to 48c are formed in a part of a circumferential wall of the accommodation concave section 42. The positioning protrusion 38 of the rotary component 33 is engaged with the notches 48a to 48c, thereby achieving that the rotation angular position of the rotary component 33 around the shaft section 43 is determined. The rotary component 33 can be set to three angular positions. Specifically, the rotary component 33 can be set to a rotation angular position in which the positioning protrusion 38 is engaged with the right side notch 48c as shown in FIG. 6A, to a rotation angular position in which the positioning protrusion 38 is engaged with the central notch 48b as shown in FIG. 5, and to a rotation angular position in which the positioning protrusion 38 is engaged with the left side notch 48a as shown in FIG. 6B. The statuses in which the rotary component 33 of the mode change switch 18 is set to the rotary angular positions shown in FIGS. 6A, 5, and 6B will be respectively referred to as "Switch Status 1", "Switch Status 2", and "Switch Status 3".

In the "Switch Status 1" shown in FIG. 6A, the contact sections 35a and 35b of the contact terminal 32 located on the rotary component 33 are in contact with the electric contacts 31a and 31b located on the substrate 20. As a result, the electric contacts 31a and 31b are electrically short-circuited or connected by the contact terminal 32. On the other hand, the electric contacts 31c and 31d are not in contact with the contact terminal 32 and are electrically insulated. In the schematic block-diagram shown in FIG. 7, the status in which the terminal 28 (corresponding to the electric contacts 31a to 31d) is connected to the terminal 29a is equivalent to the "Switch Status 1" of the mode change switch 18.

In the "Switch Status 2" shown in FIG. 5, the contact terminal 32 located on the rotary component 33 is not in contact with any of the four electric contacts 31a to 31d located on the substrate 20. Thus, the electric contacts 31a and 31b are electrically insulated in addition to that the electric contacts 31c and 31d are also electrically insulated. The status in which the terminal 28 is connected to the terminal 29b in FIG. 7 is equivalent to the "Switch Status 2" of the mode change switch 18.

In the "Switch Status 3" shown in FIG. 6B, the contact sections 35c and 35d of the contact terminal 32 located on the rotary component 33 are in contact with the electric contacts 31c and 31d located on the substrate 20. Thus, the electric contacts 31c and 31d are electrically connected by the contact terminal 32. On the other hand, the electric contacts 31a and 31b are not in contact with the contact terminal 32 and are electrically insulated from each other. The status in which the terminal 28 is connected to the terminal 29c in FIG. 7 is equivalent to the "Switch Status 3" of the mode change switch 18.

In the present embodiment, the "Switch Status 1", "Switch Status 2", and "Switch Status 3" of the mode change switch 18 respectively correspond to the "Operation Mode 1", "Operation Mode 2", and "Operation Mode 3", and the controller LSI 24 stores this correspondence relationship. As described above, the connection and insulation relationship of the four electric contacts 31a to 31d differs among the "Switch Status 1", "Switch Status 2", and "Switch Status 3". Therefore, the controller LSI 24 can detect which of the "Switch status 1", "Switch status 2", and "Switch status 3" the mode change switch 18 is set to by applying a voltage to the electric contacts 31a to 31d. The controller LSI 24 can execute any one of the "Operation Mode 1", "Operation Mode 2", and "Operation Mode 3" according to the detected status of the mode change switch 18.

If the mode change switch 18 is in the "Switch Status 1" shown in FIG. 6A (in FIG. 7, it is the status in which the terminal 28 is connected to the terminal 29a), the controller LSI 24 detects such status. Further, the controller LSI 24 that has detected the "Switch Status 1" executes the "Operation Mode 1", which corresponds to the "Switch Status 1", and only the 2 gigabytes semiconductor memory 25A becomes the control object of the controller LSI 24 (in FIG. 7, it is the status in which the controller LSI 24 is connected to the terminal 27a). Further, if the mode change switch 18 is in the "Switch Status 2" shown in FIG. 5 (in FIG. 7, it is the status in which the terminal 28 is connected to the terminal 29b), then the controller LSI 24 that has detected such status executes the "Operation Mode 2" corresponding to the "Switch Status 2". This means that both the 2 gigabytes semiconductor memory 25A and the 6 gigabytes semiconductor memory 25B, that is the 8 gigabytes information storage capacity, become the control object of the controller LSI 24. If the mode change switch 18 is in the "Switch status 3" shown in FIG. 6B (in FIG. 7, it is the state in which the terminal 28 is connected to the terminal 29c), then the controller LSI 24 that has detected such status executes the "Operation Mode 3" corresponding to the "Switch status 3". This means that only the 6 gigabytes semiconductor memory 25B becomes the control object of the controller LSI 24 (in FIG. 7, it is the status in which the controller LSI 24 is connected to the terminal 27C).

In the IC memory card 11 of the present embodiment, the storage capacity of the information storage area that is the control object of the controller LSI 24 can be switched by manipulating the mode change switch 18 so as to change the operation mode. Therefore, the IC card can be used with both the external device 15 adapted to high-capacity IC cards and the external device 15 adapted only to low-capacity IC cards. In other words, the IC memory card 11 of the present embodiment has compatibility with respect to the difference between standards of the external devices 15 relating to the storage capacity. For example, in use with the external device 15 adapted to IC memory cards with relatively high capacity, i.e., storage capacity of 6 gigabytes or 8 gigabytes, the mode change switch 18 can be set to the "Switch Status 1" or "Switch Status 2" so that the storage capacity of the information storage area that is the control object of the controller LSI 24 is set to 6 gigabytes or 8 gigabytes. On the other hand, in use with the external device 15 adapted only to IC memory cards with a relatively low capacity, i.e., storage capacity of 2 gigabytes, the mode change switch 18 can be set to the "Switch status 3" so that the storage capacity of the information storage area that is the control object of the controller LSI 24 is set to 2 gigabytes.

As described above, the mode change switch 18 is disposed in the vicinity of the edge of the housing opposite to the other edge where the external connection terminal 17 is disposed. Therefore, as recognized by referring to FIG. 1, even though the IC memory card 11 has been inserted into the external device 15, the user can see the mode change switch 18. In other words, it is easy for the user to visually recognize which of the "Switch Status 1", "Switch Status 2", and "Switch Status 3" the mode change switch 18 has been set, that is, whether the operation mode presently set for the IC memory card 11 is the "Operation Mode 1", "Operation Mode 2", or "Operation Mode 3". In particular, if marks such as numbers, letters, or color symbols representing the present operation mode is provided on the side surface of the holding section 37 of the mode change switch 18 or in the vicinity thereof, then it is easier to visually recognize the operation mode to which the IC memory card 11 is presently set even though the IC memory card 11 has been inserted into the external device 15.

Second Embodiment

Figure 11:
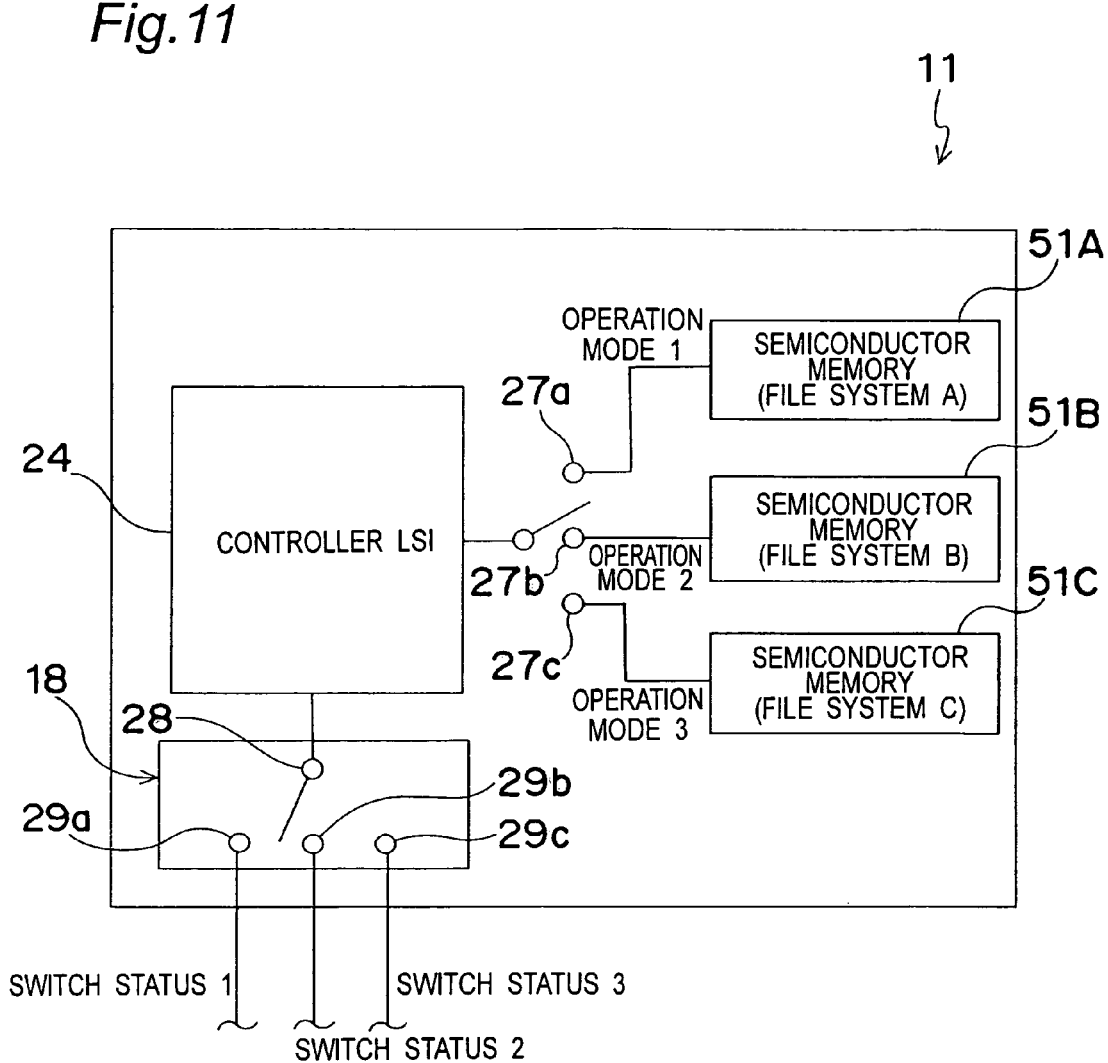
FIG. 11 is a block diagram illustrating a schematic structure of an IC memory card of a second embodiment of the present invention.

The IC memory card 11 of a second embodiment of the present invention that is shown in FIG. 11 has a structure identical to that of the IC memory card 11 of the first embodiment, except that semiconductor memories 51A, 51B, and 51C formatted to storage capacities corresponding to the mutually different file systems A, B, and C are mounted on the substrate 20 (for example, see FIG. 4). In FIG. 11, the elements identical to those of the first embodiment are assigned with the same reference symbols. Further, the structures of the IC memory card 11 of the present embodiment not shown in FIG. 11 are identical to those that have been already explained with reference to FIGS. 1 to 6B and FIGS. 8 to 10B. The present embodiment is also identical to the first embodiment in that the "Switch Status 1" shown in FIG. 6A, "Switch Status 2" shown in FIG. 5, and "Switch Status 3" shown in FIG. 6B respectively correspond to the "Operation Mode 1", "Operation Mode 2", and "Operation Mode 3", and that the controller LSI 24 detects the switch status and executes the operation mode corresponding to the detected switch status. However, the operation modes in the present embodiment are different from those of the first embodiment.

In the "Operation Mode 1", only the semiconductor memory 51A, which has been formatted to a storage capacity corresponding to the file system A, is the control object of the controller LSI 24 for the operation such as information reading or writing. In the "Operation Mode 2", only the semiconductor memory 51B, which has been formatted to a storage capacity corresponding to the file system B, is the control object of the controller LSI 24. In the "Operation Mode 3", only the semiconductor memory 51C, which has been formatted to a storage capacity corresponding to the file system C, is the control object of the controller LSI 24.

The IC memory card 11 of the present embodiment can be used with the external devices 15 employing three different types of file systems A, B, and C by switching the operation mode by manipulating the mode change switch 18 so as to change the operation mode. In other words, compatibility with respect to the difference in the file systems of the external device 15 can be ensured by manipulating the mode change switch 18. The file systems A, B, and C are not required to be entirely different from each other and they may be partially or completely identical file systems, provided that the control objects of the controller LSI 24 can be handled independently.

Third Embodiment

Figure 12:
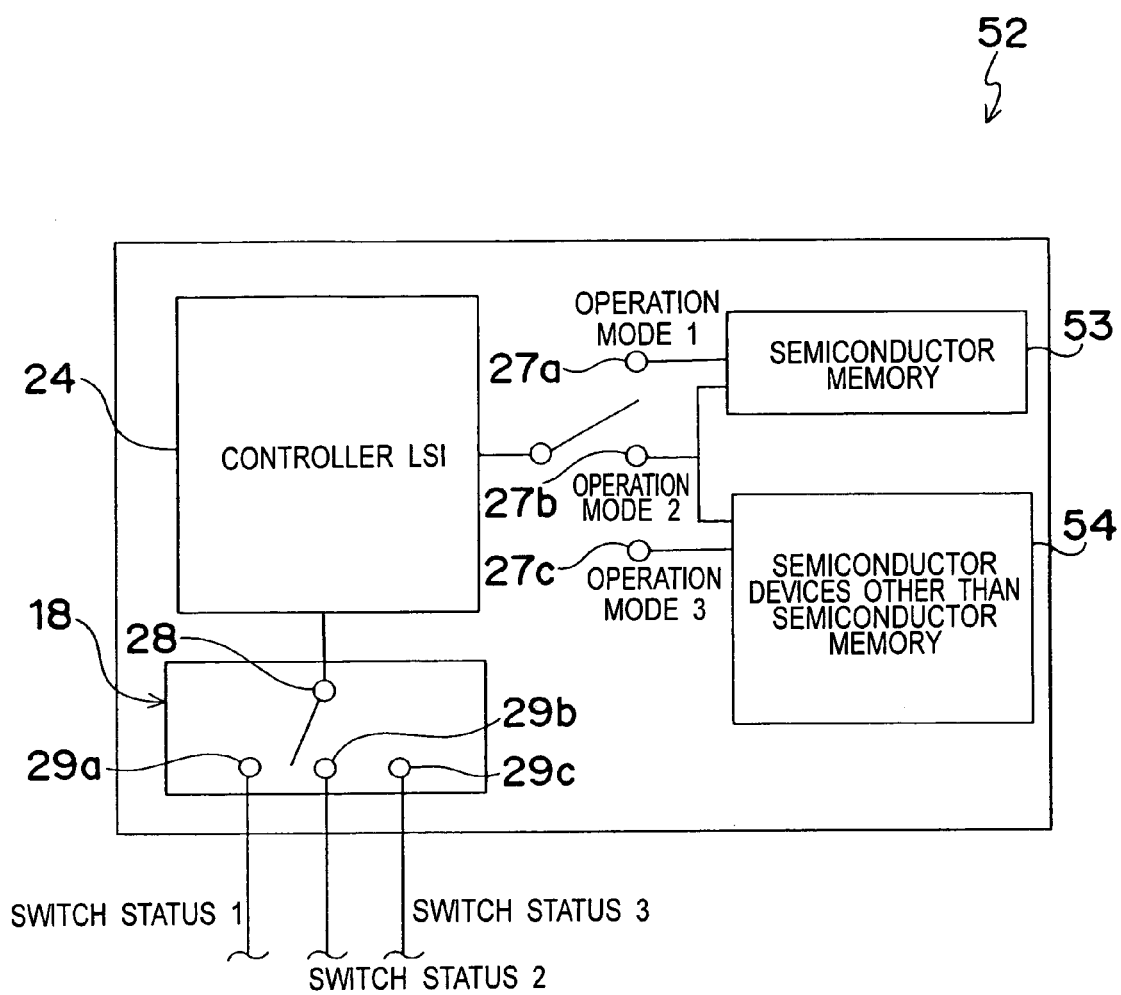
FIG. 12 is a block diagram illustrating a schematic structure of an IC card of a third embodiment of the present invention.

The IC card 52 of the third embodiment of the present invention shown in FIG. 12 has a structure identical to that of the IC memory card 11 of the first embodiment, except that mounted on the substrate 20 are a semiconductor memory 53 and a semiconductor element 54 that is different from a semiconductor memory and has functions other than information storage function, such as a communication function, an interface function, a security function, and an electronic money function. In FIG. 12, the elements identical to those of the first embodiment are assigned with the same reference symbols. Further, the structures of the IC memory card 52 of the present embodiment not shown in FIG. 12 are identical to those that have been already explained with reference to FIGS. 1 to 6B and FIGS. 8 to 10B. This present embodiment is also identical to the first embodiment in that the "Switch status 1" shown in FIG. 6A, "Switch status 2" shown in FIG. 5, and "Switch status 3" shown in FIG. 6B respectively correspond to the "Operation Mode 1", "Operation Mode 2", and "Operation Mode 3", and that the controller LSI 24 detects the switch status and executes the operation mode corresponding to the detected switch status. However, the operation modes in the present embodiment are different from those of the first embodiment.

In the "Operation Mode 1", only the semiconductor memory 53 is the control object of the controller LSI 24 for the operation such as information reading or writing. In the "Operation Mode 2", the semiconductor memory 53 and the semiconductor element 54 other than the semiconductor memory are the control objects of the controller LSI 24. Therefore, in the "Operation Mode 2", both functions such as reading and writing data or information of various types with respect to the semiconductor memory 53 and the functions such as the communication function or interface function of the semiconductor element 54 can be executed. Further, in the "Operation Mode 3", only the semiconductor element 54 other than the semiconductor memory is the control object of the controller LSI 24, therefore only functions such as the communication function or interface function of the semiconductor element 54 can be executed.

The functions that can be executed by the IC card 52 can be limited so as to be used with an external device 15 that corresponds only to such limited functions by manipulating the mode change switch 18 so as to change the operation mode. In other words, compatibility with respect to the difference in functions of the external devices 15 can be ensured by manipulating the mode change switch 18. For example, when the external device 15 corresponds to an IC card having an information storage function, but does not correspond to an IC card having a communication function or an interface function, the IC card 52 of the present embodiment can be used with such external device 15 by setting the mode change switch 18 to the "Switch Status 1" for obtaining the "Operation Mode 1". Likewise, when the external device 15 corresponds to an IC card having a communication function or an interface function, but does not correspond to an IC card having an information storage function, the IC card 52 of the present embodiment can be used with such external device 15 by setting the mode change switch 18 to the "Switch Status 3" for obtaining the "Operation Mode 3".

Fourth Embodiment

FIGS. 13 to 17B show an IC memory card 11 of a fourth embodiment of the present invention.

Figure 14:
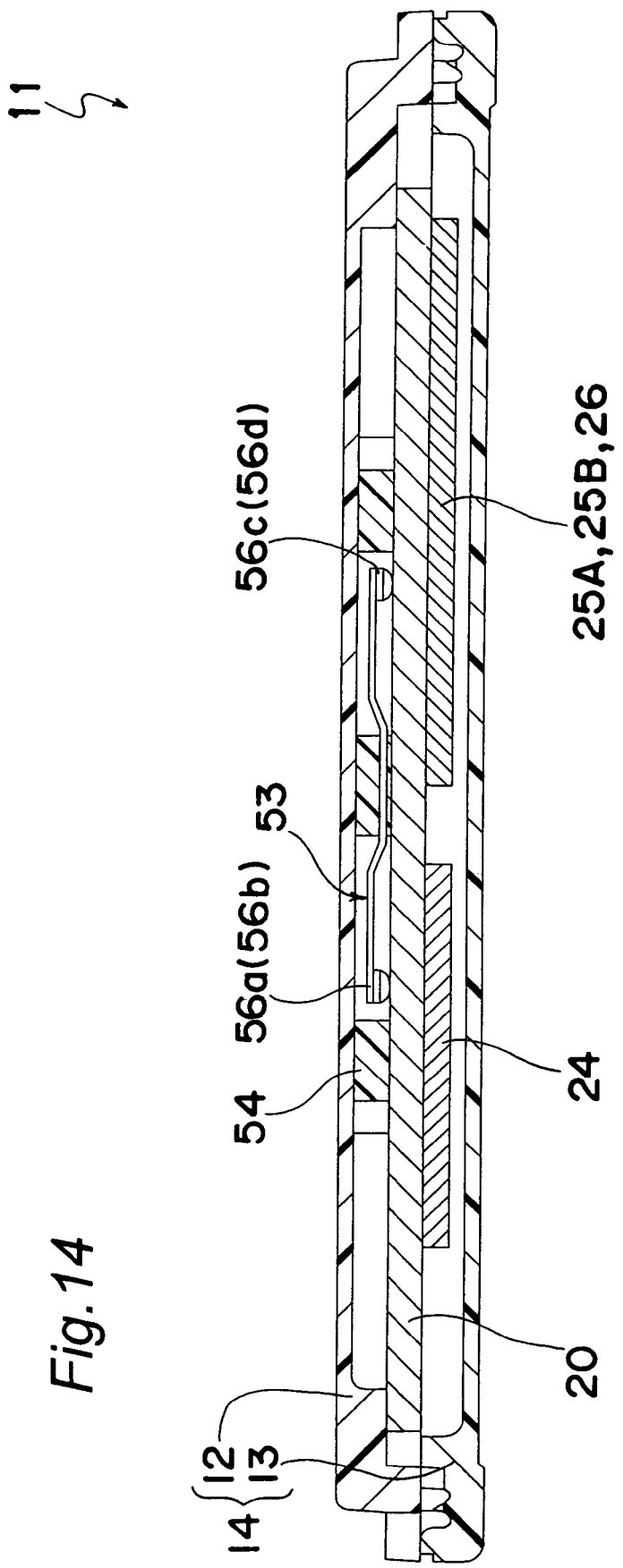
FIG. 14 is a schematic cross-sectional view along a line XIV-XIV in FIG. 13.
Figure 15:
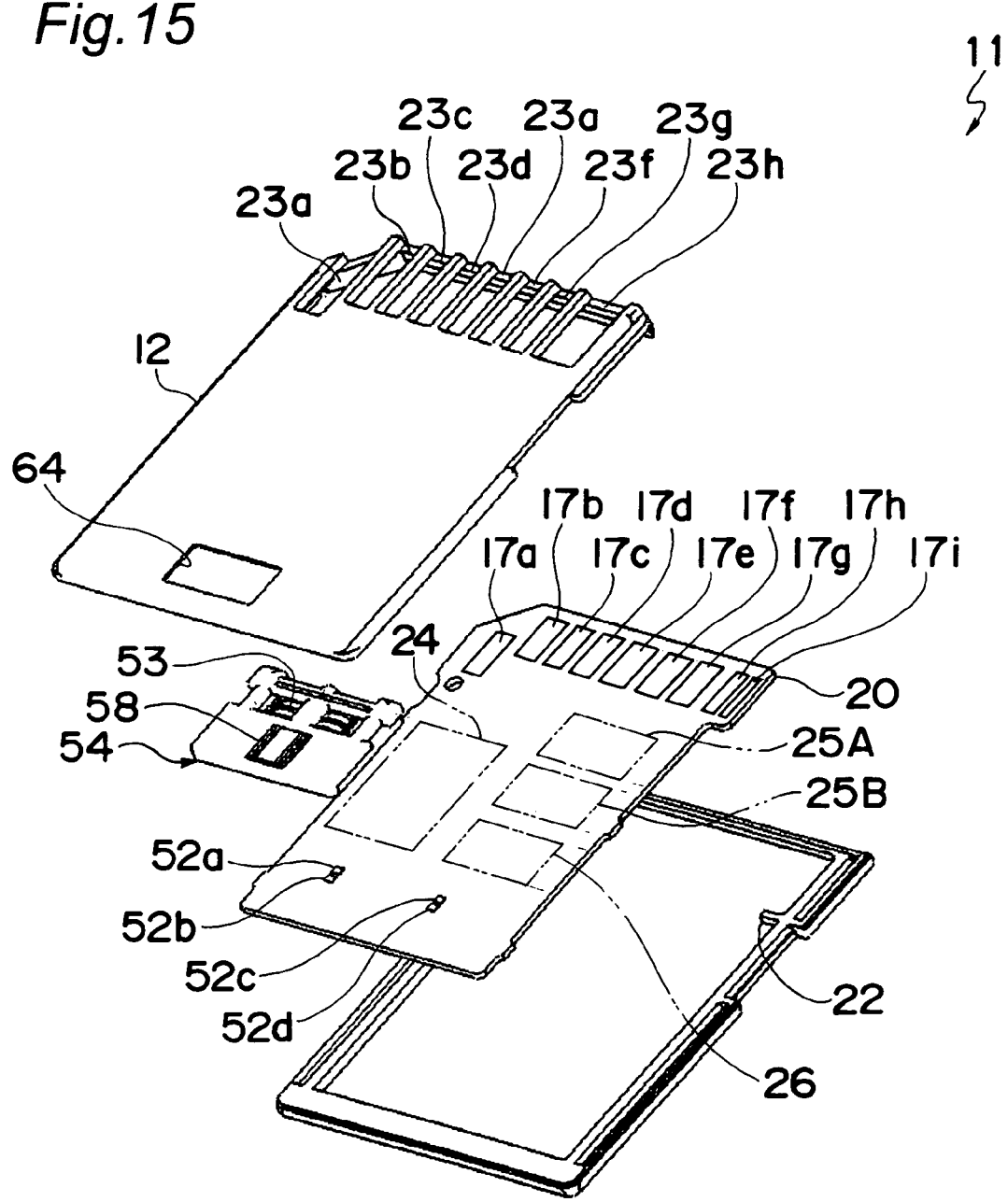
FIG. 15 is an exploded perspective view of an IC card of a fourth embodiment of the present invention.
Figure 16:
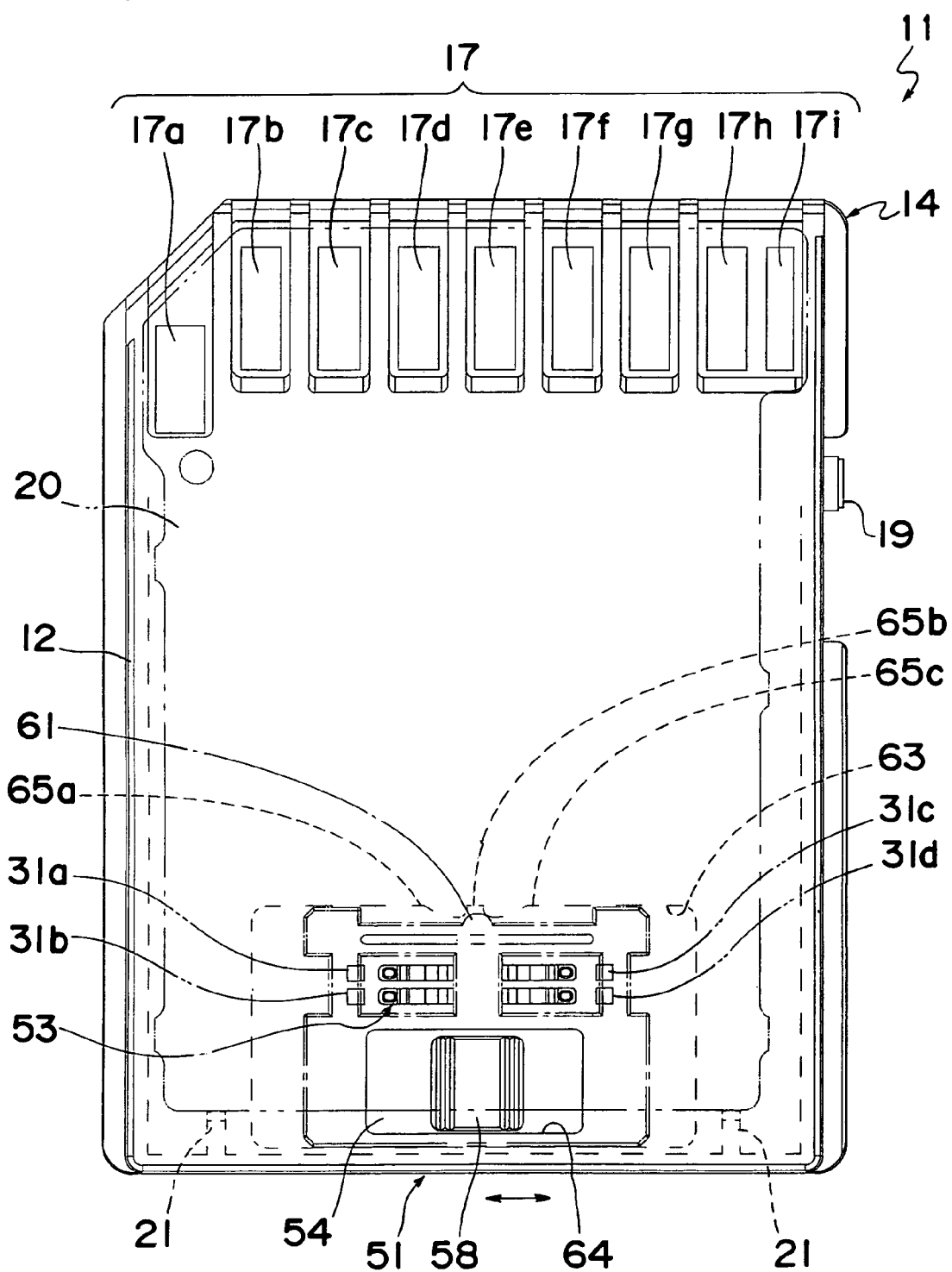
FIG. 16 is a transparent view as viewed from a lower side of the IC memory card of the fourth embodiment of the present invention.

A mode change switch 51 of the present embodiment is a slide switch. Referring to FIGS. 14 to 16, the mode change switch 51 comprises four electric contacts 52a to 52d provided on the same surface of the substrate 20 as the surface where the external connection terminals 17a to 17i are provided, and a slide component (first molded component) 54 to which a contact terminal 53 for switching the electric connection of the electric contacts 52a to 52d is attached. The slider component 54 is molded from a resin. Further, the lower housing 12 of the housing 14 also functions as a part of the mode change switch 51. As most clearly shown in FIGS. 14 and 15, the slide component 54 is disposed between the lower housing 12 and substrate 20.

Figure 19A:
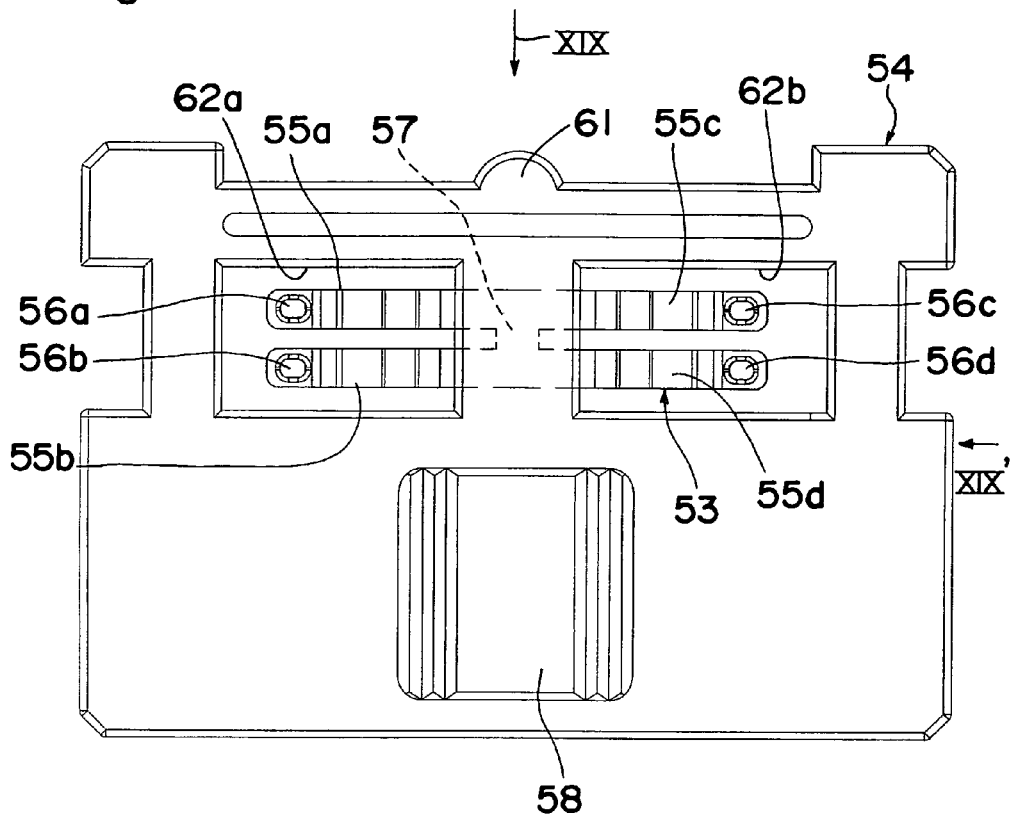
FIG. 19A is a plan view of a slide component.
Figure 19B:
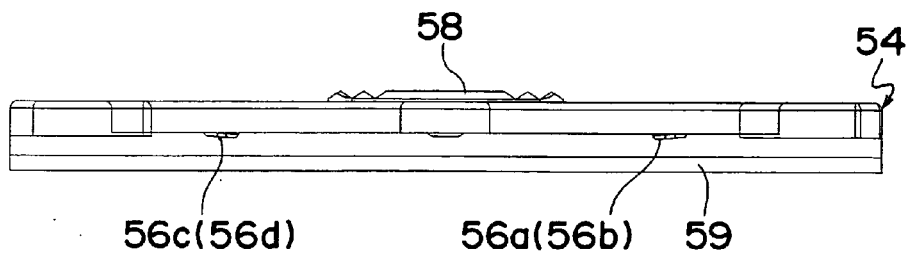
FIG. 19B is a view illustrating the slide component, as viewed from an arrow XIX in FIG. 19A.
Figure 19C:
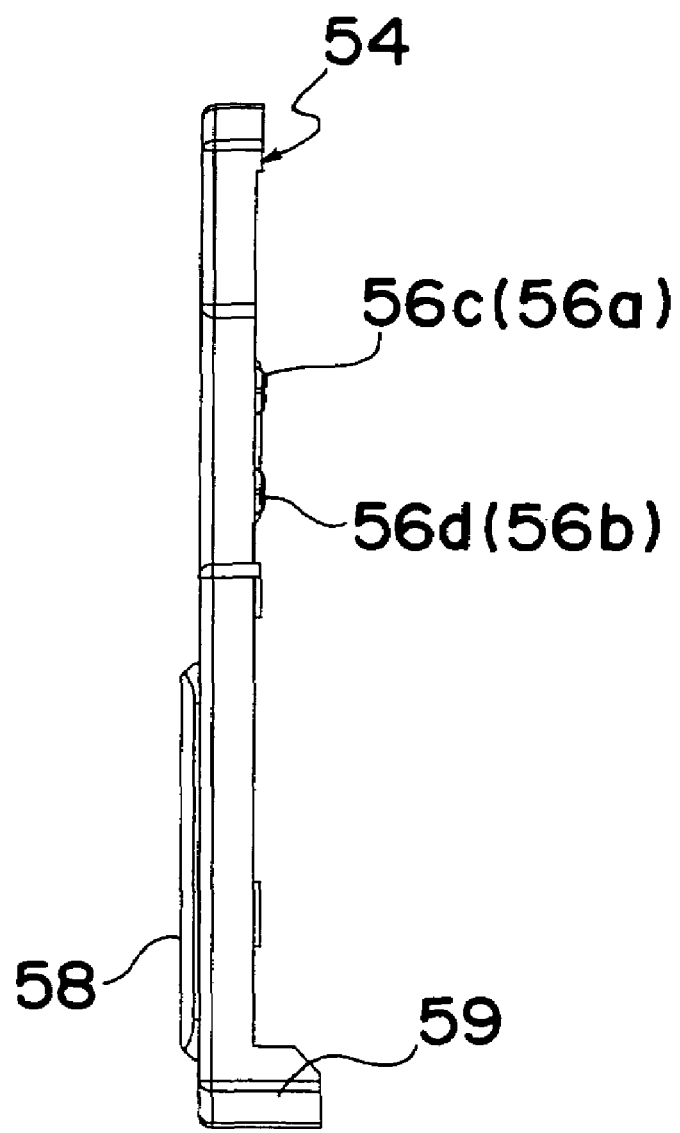
FIG. 19C is a view illustrating the slide component, as viewed from the arrow XIX' in FIG. 19A.
Figure 20:
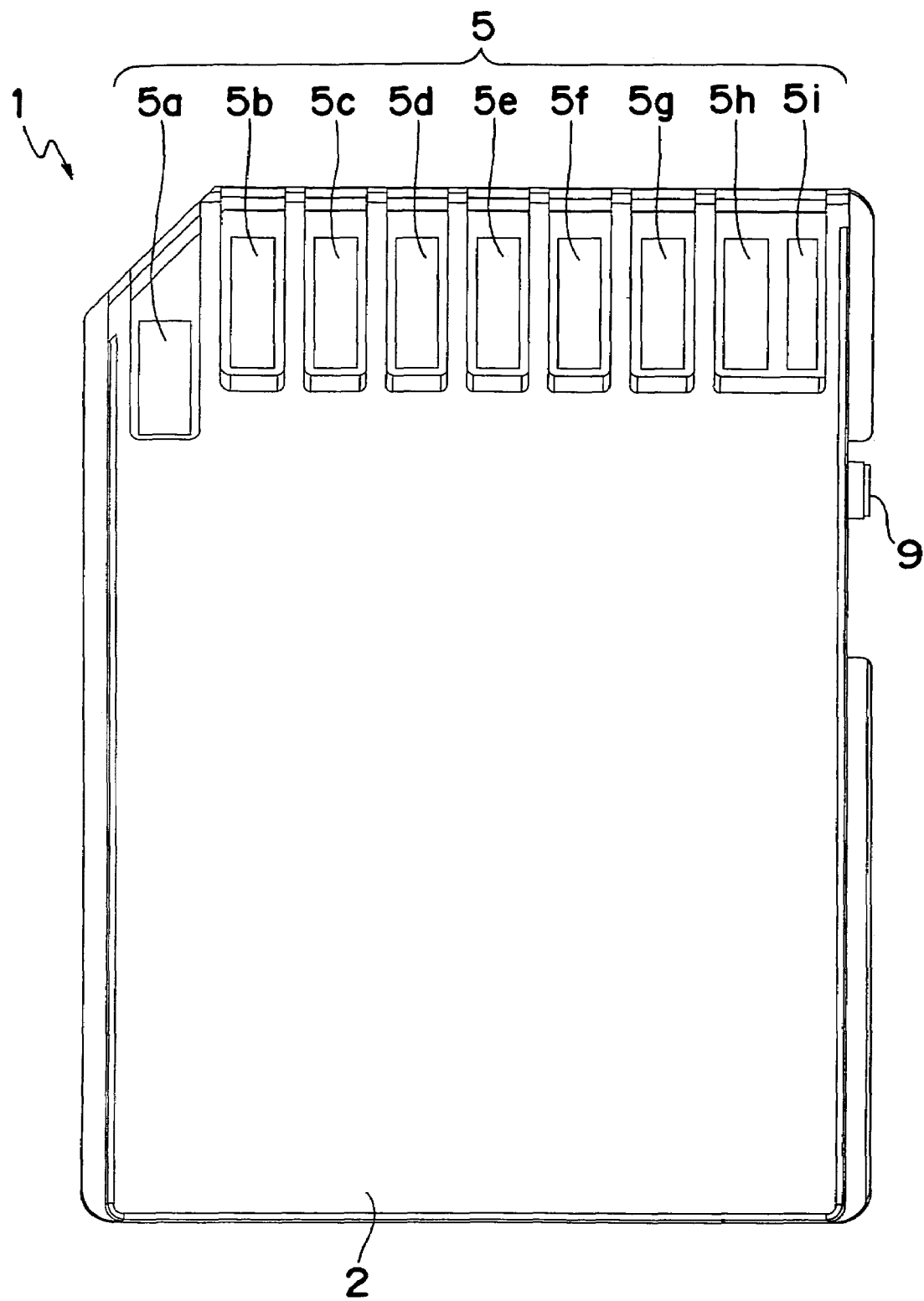
FIG. 20 is a lower side view of a conventional IC memory card.

Also referring to FIG. 19A to FIG. 19C, the contact terminal 53 comprises four straight or linear elastic pieces 55a to 55d. Contact sections 56a to 56d are provided on distal ends of respectively elastic pieces 55a to 55d. On the other hand, proximal sides of the elastic pieces 55a to 55d are joined to each other by a common base section 57.

The slide component 54 comprises a holding section 58 on an upper surface at a lower side as shown in FIG. 19A. Further, as shown in FIG. 19C, a protrusion 61 extending along a lower side edge is provided on a lower surface of the slide component 54. Furthermore, the slide component 54 comprises a positioning protrusion 61 that protrudes outwardly in a location opposite to the holding section 58. In the slide component 54, a pair of symmetrically arranged rectangular holes 62a and 62b is formed so as to pass through in the thickness direction. The base section 57 of the contact terminal 53 is molded in the slide component 54. The elastic pieces 55a and 55b of the contact terminal 53 protrude into one rectangular hole 62a, whereas the elastic pieces 55c and 55b protrude into the other rectangular hole 62b.

Figure 13:
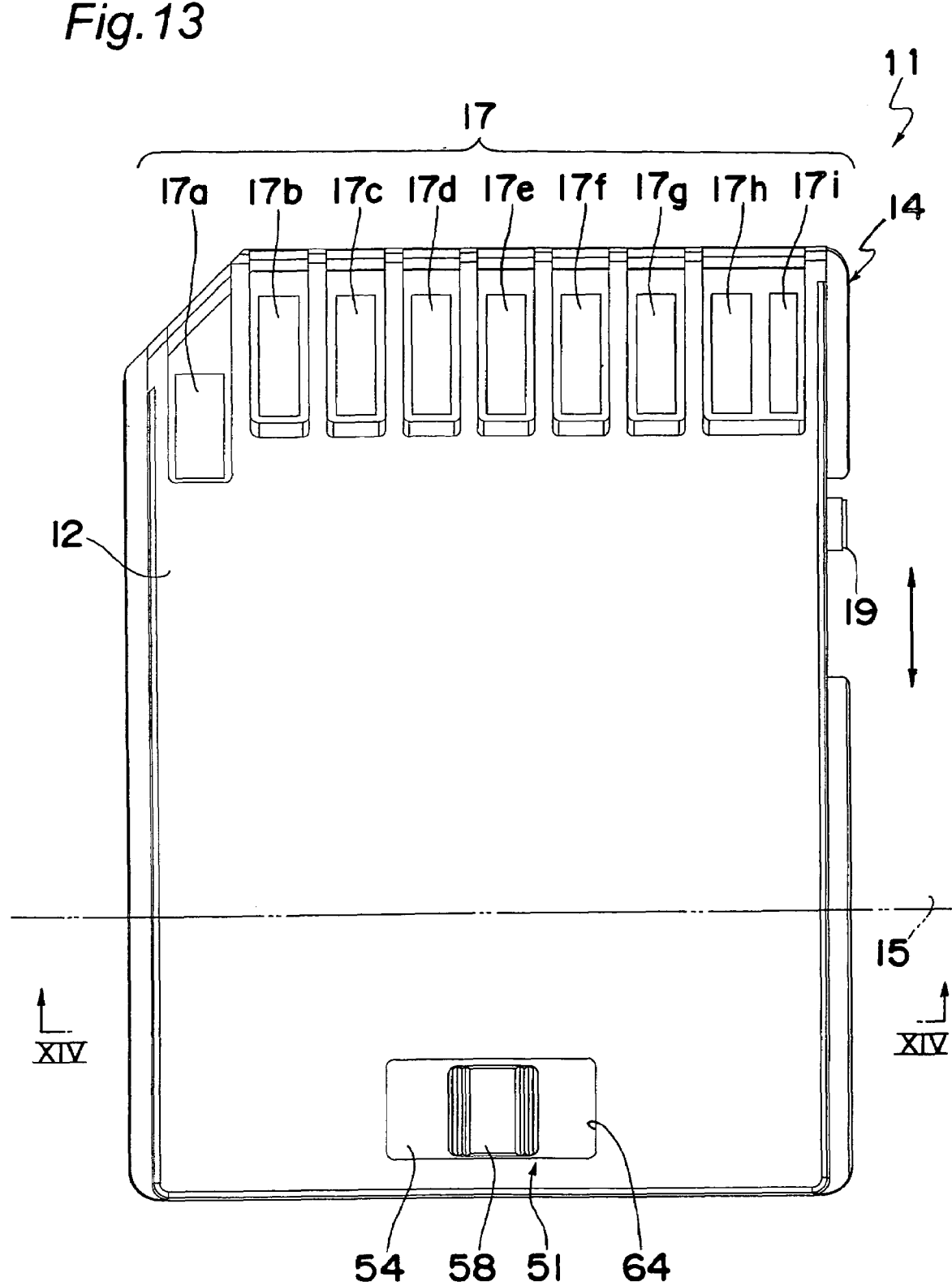
FIG. 13 is a lower side view of an IC card of a fourth embodiment of the present invention.
Figure 18:
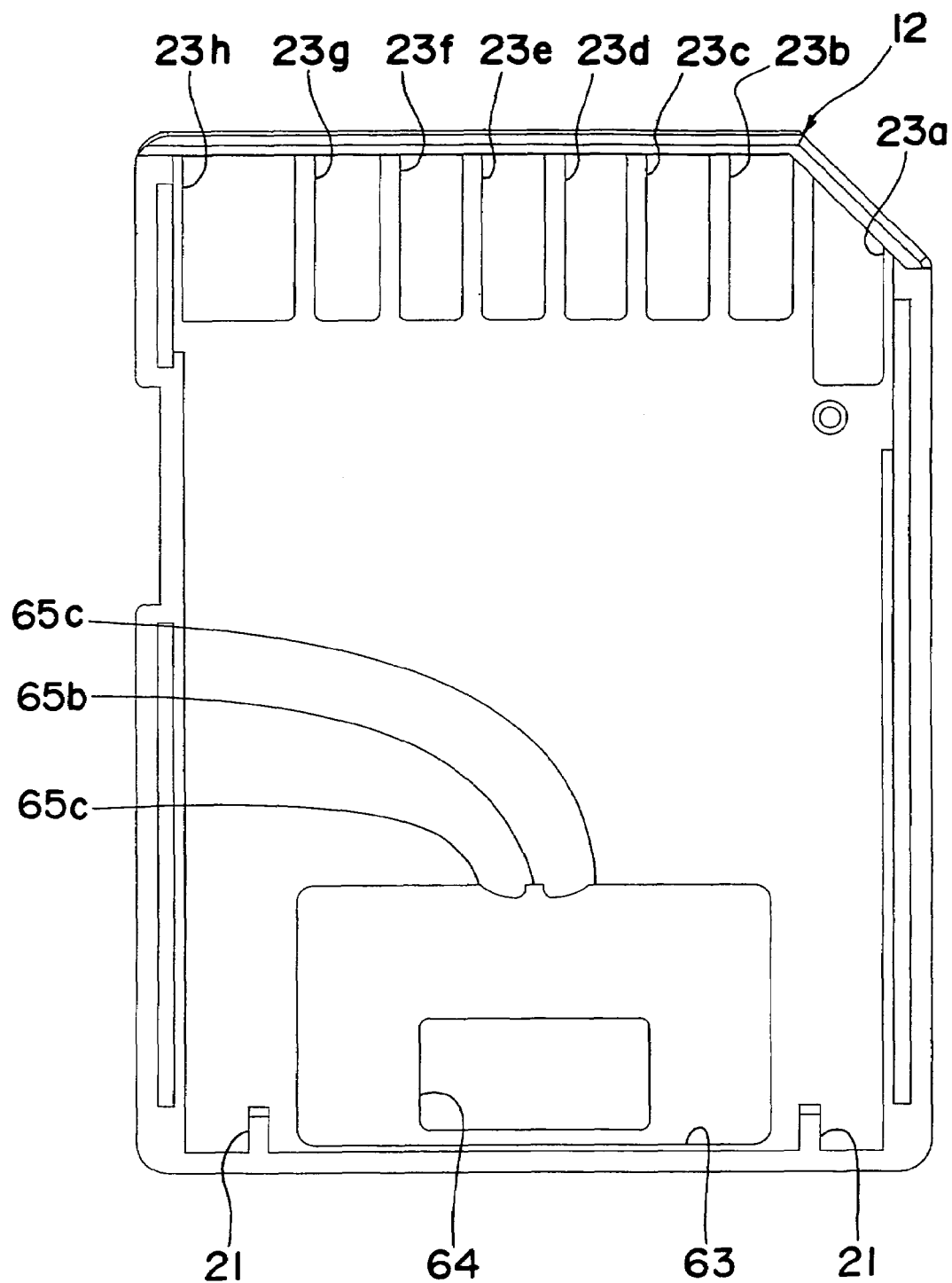
FIG. 18 illustrates an inner surface side of a lower housing.

Also referring to FIG. 18, an accommodation concave section 63 having an outer contour similar to that of the slide component 54 is formed in the vicinity of the edge of the inner surface of the lower housing 12 opposite to the terminal openings 23a and 23h. The slide component 54 is accommodated in the accommodation concave section 63, and can move linearly inside the accommodation concave section 63 with respect to the substrate 20 and housing 14. A window hole 64 communicating the inside and outside of the lower housing 12 is formed in a lower surface of the accommodation concave section 63. As shown in FIG. 13, a part of the slide component 54 including the holding section 58 is exposed to the outside of the housing 14 via the window hole 64. Therefore, the user can move the slide component 54 linearly by manipulating the holding section 58.

As described above, the slide component 54 is disposed between the lower housing 12 and substrate 20. Referring to FIG. 16, the lower edge of the slide component 54 protrudes from the edge of the substrate 20, and a distal end of the protruding section 59 abuts against the inner surface of the upper housing 13. Because the space between the lower surface of the accommodation concave section 63 and substrate 20 is approximately limited to a thickness of the slide component 54 except the protruding section 59, the slide component 54 is pressed or pushed by the lower housing 12 to the substrate 20. Such pushing action of the lower housing 12 ensures the contact pressure between the contact sections 56a to 56d of the contact terminal 53 fixed to the slide component 54 and the electric contacts 52a to 52d. Thus, pushing the slide component 54 with the lower housing 12, which is part of the housing 14, ensures the contact pressure between the contact terminal 53 and electric contacts 52a to 52d. Therefore, the slide component 54 is not required to be a thin component that needs accurate processing and the substrate 20 is not required to be subjected to special processing such as the formation of a through hole to dispose the slide component 54. Thus, the mode change switch 51 can be incorporated in the IC memory card 11 with a simple arrangement. Therefore, the IC memory card 11 of this embodiment is thin and small in size.

Figure 17A:
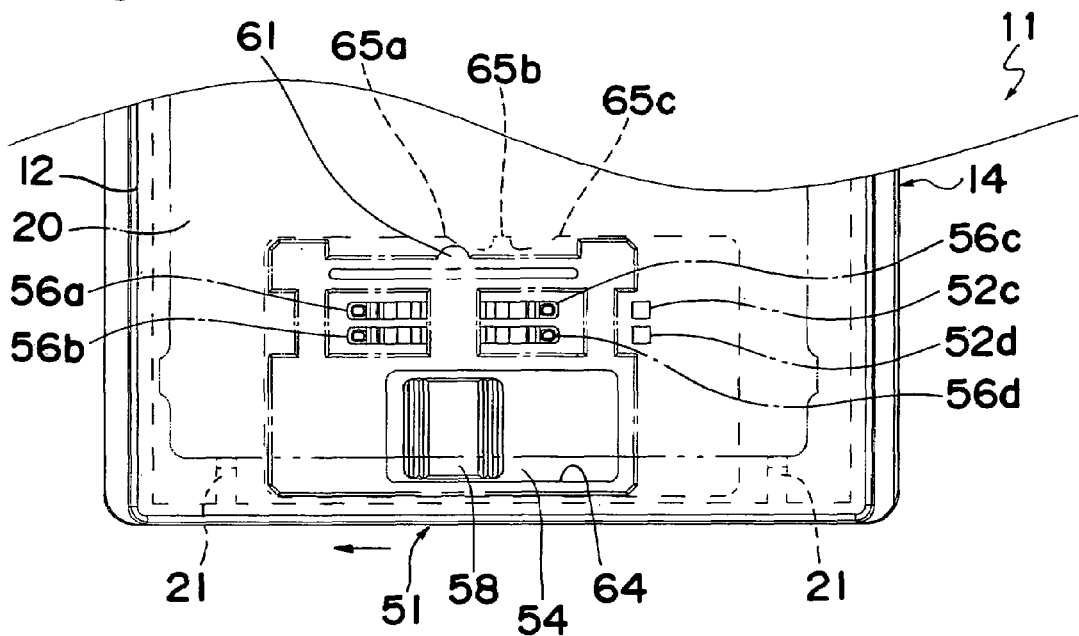
FIG. 17A is a partial transparent view as viewed from a lower side of the IC memory card of the fourth embodiment of the present invention in which a mode change switch is set to a switch status 1.
Figure 17B:
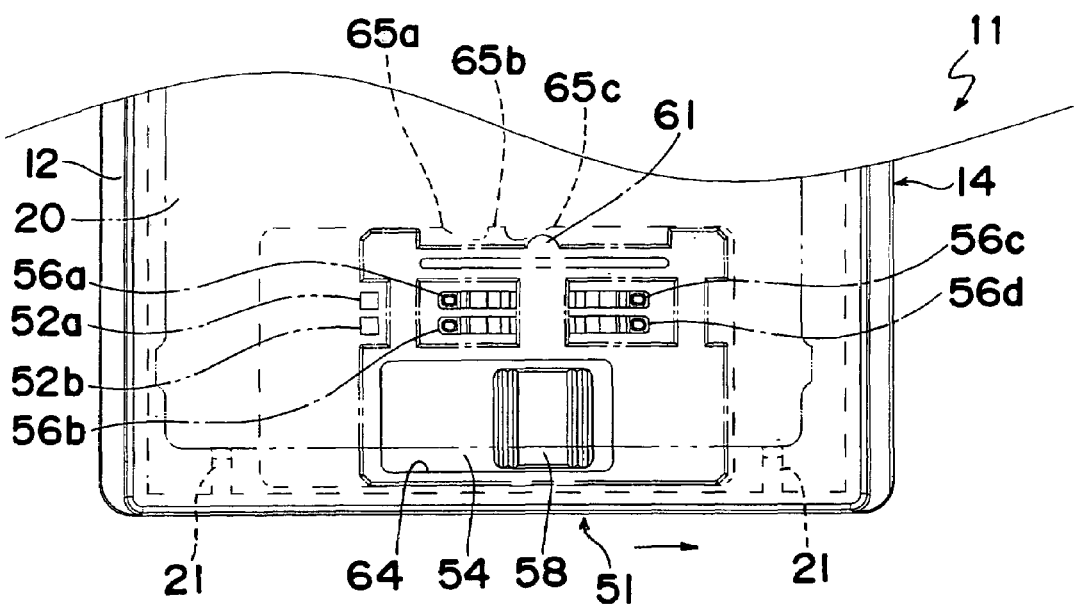
FIG. 17B is a partial transparent view as viewed from the lower side of the IC memory card of the fourth embodiment of the present invention in which the mode change switch is set to a switch status 3.

Referring to FIGS. 16 to 18, notches 65a to 65c are formed in a part of a circumferential wall of the accommodation concave section 63. The positioning protrusion 61 of the slide component 54 is engaged with the notches 65a to 65c, thereby achieving that a position of the slide component 54 is determined. The slide component 54 can be set to three positions. Specifically, the slide component 54 can be set to a position in which the positioning protrusion 61 is engaged with the left side notch 65a as shown in FIG. 17A (Switch Status 1), to a position in which the positioning protrusion 61 is engaged with the central notch 65b as shown in FIG. 16 (Switch Status 2), and to a position in which the positioning protrusion 61 is engaged with the right side notch 65c shown in FIG. 17B (Switch Status 3).

In the "Switch Status 1" shown in FIG. 17A, the contact sections 56a and 56b of the contact terminal 53 located on the slide component 54 are in contact with the electric contacts 52a and 52b located on the substrate 20. Thus, the electric contacts 52a and 52b are electrically short-circuited or connected by the contact terminal 53. On the other hand, the electric contacts 52c and 52d are not in contact with the contact terminal 53 and are electrically insulated. In the "Switch Status 2" shown in FIG. 16, the contact terminal 53 located on the slide component 54 is not in contact with any of the four electric contacts 52a to 52d located on the substrate 20. Thus, the electric contacts 52a and 52b are electrically insulated as well as that the electric contacts 52c and 52d are electrically insulated. In the "Switch Status 3" shown in FIG. 17B, the contact sections 56c and 56d of the contact terminal 53 located on the slide component 54 are in contact with the electric contacts 52c and 52d located on the substrate 20. Thus, the electric contacts 52c and 52d are electrically connected by the contact terminal 53. On the other hand, the electric contacts 52a and 52b are not in contact with the contact terminal 53 and are electrically insulated from each other.

As described above, the connection and insulation relationship of the four electric contacts 52a to 52d differs among the "Switch status 1", "Switch status 2", and "Switch status 3". Therefore, the controller LSI 24 can detect which of the "Switch status 1", "Switch status 2" and "Switch status 3" the mode change switch 18 is set to by applying a voltage to the electric contacts 52a to 52d and can execute any one of the "Operation Mode 1", "Operation Mode 2" and "Operation Mode 3" according to the detection result.

Since other features and operations of the fourth embodiment are identical to those of the first embodiment, the same elements are assigned with the same reference symbols, and detailed explanations thereof are omitted. The slide-type mode change switch 51 of the present embodiment can be also employed in the IC memory card 11 of the second embodiment or the IC card 52 of the third embodiment.

The present invention is not limited to the above-described embodiments and can be changed in a variety of ways. The mechanical structure of the mode change switch is not limited to that of the embodiments as far as that the mode change switch can be set in a plurality of positions or statuses. Further, a plurality of information storage areas may be set for one semiconductor memory and of the information storage area that will be the control object for the controller LSI may be switched according to the status of the mode change switch. Furthermore, the number of the switch statuses of the mode change switch and operation modes corresponding thereto is not limited to 3 and may be 2 or 4 and more.

Although having a high-capacity and being multifunctional, the IC card of the present invention can achieve compatibility with existing devices by limiting a part of information storage capacity or functions by manipulating a mode change switch so as to switch operation modes. Further, because switching of the operation mode is executed by manipulating the mode change switch, it is easy for the user to visually recognize the operation mode. As a result, the IC card of the present invention is suitable as an IC memory card having a semiconductor memory that can be used as a medium for storing information such as data or audio signals in small portable devices, as an IC card having a function other than the information storage function, for example, a communication function or an interface function, and an IC card having the information storage function and also other functions.

The invention claimed is:

1. An IC card comprising:
   a semiconductor component having at least two operation modes;
   a substrate on which the semiconductor component is mounted;
   a housing accommodating the substrate; and
   a physical switch for switching the operation modes of the semiconductor component
   wherein the physical switch comprises:
   a plurality of electric contacts provided on the substrate; and
   a movable molded component comprising a contact terminal for switching electric connection of the electric contacts and a holding section, wherein the holding section is partially outside of the housing to permit manipulation thereof,
   wherein a part of an inner surface of the housing directly contacts the molded component so as to press the molded component against a surface of the substrate where the electric contact is provided, thereby maintaining contact pressure of the contact terminal against the electric contact.

2. The IC card according to claim 1, wherein the physical switch can be set to at least two statuses each corresponding to any of one the operation modes, and
   wherein the semiconductor component comprises a controller for detecting the status of the physical switch and switching the operation mode according to the detected status of the physical switch.

3. The IC card according to claim 2, wherein the contact terminal is provided with an elastic piece having a contact section for connecting the electric contact at a proximal side and being fixed to the molded component at a distal side.

4. The IC card according to claim 3, wherein the molded component of the physical switch is rotatable with respect to the substrate and the inner surface of the housing.

5. The IC card according to claim 4, wherein the molded component is received in an accommodation concave section, formed in the inner surface of the housing, so that the molded component can rotate inside the accommodation concave section relative to the substrate and the housing.

6. The IC card according to claim 3, wherein the molded component of the physical switch can move linearly with respect to the substrate and the inner surface of the housing.

7. The IC card according to claim 6, wherein the molded component is received in an accommodation concave section, formed in the inner surface of the housing, so that the molded component can move linearly inside the accommodation concave section relative to the substrate and the housing.

8. The IC card according to claim 3, further comprising an external connection terminal for electric connection to an external device disposed on one edge side of the housing,
   wherein the physical switch is disposed on the other edge side opposite to the edge of the housing where the external connection terminal is disposed.

9. The IC card according to claim 2, wherein the semiconductor component comprises at least one semiconductor memory,
   wherein the semiconductor memory has a plurality of information storage areas each of which is allocated as a usable area for each of the operation modes, and
   wherein the controller designates the information storage area as the usable area according to the detected status of the physical switch.

10. The IC card according to claim 9, wherein the plurality of information storage areas of the semiconductor memory are formatted to storage capacity corresponding to respective file systems, and each of the information storage areas of the semiconductor memory is allocated as the usable area for any one of the operation modes.

11. The IC card according to claim 2, wherein the semiconductor component comprises a semiconductor memory and another semiconductor component for executing a function other than information storage, and any one or both of the semiconductor memory and the other semiconductor component is allocated to each of the operation modes, and
   wherein the controller activates any one or both of the semiconductor memory and the other component according to the detected status of the physical switch.

* * * * *